(12) United States Patent
Wroblewski et al.

(10) Patent No.: US 8,644,961 B2
(45) Date of Patent: Feb. 4, 2014

(54) MODEL BASED CONTROL AND ESTIMATION OF MERCURY EMISSIONS

(75) Inventors: David J. Wroblewski, Mentor, OH (US); Stephen Piche, Austin, TX (US)

(73) Assignee: NeuCo Inc., Boston, MA (US)

( * ) Notice: Subject to any disclaimer, the term of this patent is extended or adjusted under 35 U.S.C. 154(b) by 1533 days.

(21) Appl. No.: 11/301,034

(22) Filed: Dec. 12, 2005

(65) Prior Publication Data

US 2007/0156288 A1 Jul. 5, 2007

(51) Int. Cl.
*G05B 13/02* (2006.01)

(52) U.S. Cl.
USPC ............... 700/28; 700/266; 700/286; 706/19; 706/21; 706/907

(58) Field of Classification Search
USPC .................. 700/266, 286, 28; 706/19, 21, 907
See application file for complete search history.

(56) References Cited

U.S. PATENT DOCUMENTS

| | | | |
|---|---|---|---|
| 3,662,523 A | 5/1972 | Revoir et al. ................... 55/387 |
| 4,729,882 A | 3/1988 | Ide et al. ....................... 423/210 |
| 4,889,698 A | 12/1989 | Moller et al. ................. 423/210 |
| 5,167,009 A | 11/1992 | Skeirik ........................... 395/27 |
| 5,212,765 A | 5/1993 | Skeirik ........................... 395/11 |
| 5,282,261 A | 1/1994 | Skeirik ........................... 395/22 |
| 5,386,373 A | 1/1995 | Keeler et al. .................. 364/577 |
| 5,435,980 A | 7/1995 | Felsvang et al. ............. 423/210 |
| 5,672,323 A | 9/1997 | Bhat et al. ..................... 422/172 |
| 5,729,470 A | 3/1998 | Baier et al. .................... 364/497 |
| 5,781,432 A | 7/1998 | Keeler et al. .................. 364/164 |
| 5,848,402 A | 12/1998 | Pao et al. ........................ 706/13 |
| 5,933,345 A | 8/1999 | Martin et al. .................. 364/164 |
| 6,047,221 A | 4/2000 | Piche et al. ..................... 700/44 |
| 6,243,696 B1 | 6/2001 | Keeler et al. .................... 706/21 |
| 6,278,899 B1 | 8/2001 | Piche et al. ..................... 700/44 |
| 6,381,504 B1 | 4/2002 | Havener et al. ................. 700/44 |
| 6,438,430 B1 | 8/2002 | Martin et al. .................... 700/28 |
| 6,487,459 B1 | 11/2002 | Martin et al. .................... 700/44 |
| 6,725,208 B1 | 4/2004 | Hartman et al. ................ 706/23 |
| 6,726,888 B2* | 4/2004 | Lanier et al. ................... 423/99 |
| 6,818,043 B1 | 11/2004 | Chang et al. ..................... 95/37 |
| 6,863,005 B2 | 3/2005 | Lanier et al. .................. 110/345 |
| 6,878,358 B2 | 4/2005 | Vosteen et al. ............... 423/210 |
| 6,895,875 B1 | 5/2005 | Lissianski et al. ........... 110/345 |
| 2003/0085179 A1 | 5/2003 | Kim et al. ..................... 210/739 |
| 2004/0199481 A1 | 10/2004 | Hartman et al. ................ 706/21 |
| 2005/0075737 A1 | 4/2005 | Martin et al. .................. 700/29 |
| 2007/0079737 A1* | 4/2007 | Breen et al. .................. 110/345 |

OTHER PUBLICATIONS

Jensen et al., Artificial neural network-based estimation of mercury speciation in combustion flue gases, Jun. 15, 2004, Fuel Processing technology, 85, pp. 451-462.*

(Continued)

*Primary Examiner* — Jonathan Hurst
(74) *Attorney, Agent, or Firm* — Kusner & Jaffe

(57) ABSTRACT

A method and apparatus for estimating and/or controlling mercury emissions in a steam generating unit. A model of the steam generating unit is used to predict mercury emissions. In one embodiment of the invention, the model is a neural network (NN) model. An optimizer may be used in connection with the model to determine optimal setpoint values for manipulated variables associated with operation of the steam generating unit.

50 Claims, 8 Drawing Sheets

(56) References Cited

OTHER PUBLICATIONS

Zhou et al., Multi-objective optimization of the coal combustion performance with artificial neural networks and genetic algorithms, Feb. 24, 2005, International Journal of Energy Research, 29, pp. 499-510.*

U.S. Appl. No. 11/053,734, filed Feb. 8, 2005, Wroblewski et al., entitled: Method and Apparatus for Optimizing Operation of a Power Generating Plant Using Artificial Intelligence Techniques.

Barto, "Connectionist Learning for Control," Neural Networks for Control, edited by Miller, W., Sutton, R. and Werbos, P., MIT Press, pp. 5-58, 1990.

Bhat et al., "Modeling Chemical Process Systems via Neural Computation," IEEE Control Systems Magazine, April, pp. 24-30, 1990.

Bishop, "The Multi-Layer Perceptron," *Neural Networks for Pattern Recognition*, Clarendon Press, Oxford, UK, pp. 116-163, 1995.

Piche, "Steepest Descent Algorithms for Neural Network Controllers and Filters," *IEEE Transactions on Neural Networks*, vol. 5, No. 2, pp. 198-212, 1994.

Piche et al., "Nonlinear Model Predictive Control using Neural Networks," IEEE Control Systems Magazine, vol. 20, No. 2, pp. 53-62, 2000.

Hower et al., "Studies of Mercury Capture on Fly Ash: Examples from Power Plants Burning Kentucky Coals," 2001 International Ash Utilization Symposium, 2001.

Senior, "Behavior of Mercury in Air Pollution Control Devices on Coal-Fired Utility Boilers," Power Production in the 21st Century Conference, Snowbird, UT, Oct. 28-Nov. 1, 2001.

Licata et al., "Mercury Control Alternatives for Coal-Fired Power Plants," Power Gen 2002, Orlando, FL, Dec. 2002.

Schofield, "Let them eat fish: hold the mercury," Chemical Physics Letters, 386, pp. 65-69, 2004.

Eckberg et al., "Mercury Control Evaluation of Halogen Injection into a Texas Lignite-Fired Boiler," Proceedings of Electric Utilities Environmental Conference, Tucson, AZ, 2005.

Lissianski, "Integrated and Cost-Effective Approach to Mercury Control," Proceedings of Electric Utilities Environmental Conference, Tucson, AZ, 2005.

Schofield, "Development of a Low Cost Mercury Control Method Based on its Natural Propensity for Heterogeneous Chemistry," 2005 Clearwater Coal Conference, Clearwater, FL, Apr. 2005.

Feeley et al., "Field Testing of Mercury Control Technologies for Coal-Fired Power Plants," DOE/NETL Mercury R&D Program Review, May 2005.

Blankinship, "Mercury Control Now on the Table," Power Engineering, pp. 22-32, May 2005.

Schittkowski et al., "Nonlinear Programming," Department of Mathematics, University of Bayreuth, D-95440 Bayreuth, Germany, 2003.

* cited by examiner

MODEL BASED CONTROL AND ESTIMATION OF MERCURY EMISSIONS

FIELD OF THE INVENTION

The present invention relates generally to the operation of a steam generating unit, and more particularly to a method and apparatus for optimizing the operation of a steam generating unit using artificial intelligence and advanced control techniques for reducing emissions of mercury.

BACKGROUND OF THE INVENTION

In a conventional fossil fuel-fired (e.g., coal-fired) steam generating unit a fossil fuel/air mixture is ignited in a boiler. Large volumes of water are pumped through tubes inside the boiler, and the intense heat from the burning fuel turns the water in the boiler tubes into high-pressure steam. In an electric power generating application, the high-pressure steam from the boiler passes into a turbine comprised of a plurality of turbine blades. Once the steam hits the turbine blades, it causes the turbine to spin rapidly. The spinning turbine causes a shaft to turn inside a generator, creating an electric potential. Alternatively, the high-pressure steam may be used for steam heating or other applications.

As used herein, the term "steam generating plant" refers to one or more steam generating units. A "power plant" refers herein to a steam generating plant used to drive turbines for generating electricity. A steam generating unit is typically powered by fossil fuels (including but not limited to, coal, natural gas or oil), and includes a boiler for producing high temperature steam; air pollution control (APC) devices for removal of pollutants from the flue gas; a stack for release of flue gas; and a water cooling system for condensing the high temperature steam. A typical steam generating unit will be described in detail below.

Boiler combustion or other characteristics of a fossil fuel-fired steam generating unit are influenced by dynamically varying plant parameters including, but not limited to, air to fuel ratios, operating conditions, boiler configuration, slag/soot deposits, load profile, fuel quality and ambient conditions. Changes to the business and regulatory environments have increased the importance of dynamic factors such as fuel variations, performance criteria, emissions control, operating flexibility and market driven objectives (e.g., fuel prices, cost of emissions credits, cost of electricity, etc.).

About half of the electric power generated in the United States is generated using coal-fired steam generating units. Coal typically contains trace amounts of mercury, and thus coal-fired steam generating units emit small amounts of mercury as a gaseous byproduct of coal combustion.

Mercury is a naturally occurring metallic element that exists in liquid form at room temperature. Mercury can combine with other elements, such as chlorine, sulfur or oxygen, to form inorganic compounds. Mercury can also combine with carbon to form organic mercury compounds. Methylmercury is one form of organic mercury in the environment, which can be toxic, easily absorbed in the digestive system of humans and wildlife, and not easy to eliminate once absorbed.

Forms of mercury are known to have toxic effects on the nervous system of humans and wildlife. Mercury released into the air from power plants can return to the land and water. In water, bacteria can transform certain species of the metal into methylmercury. Methylmercury can bio-accumulate in the aquatic food chain resulting in dangerously high concentrations of mercury in predatory fish and fish eating mammals and birds.

Due to concerns about the accumulation of mercury in fish, mammals and humans, on Mar. 15, 2005, the U.S. Environmental Protection Agency (EPA) issued a regulation for the control of mercury emissions from coal-fired power plants. The regulation requires coal-fired power plants in the United States to reduce emissions from an estimated 48 tons in 2003 to 38 tons in 2010. Emissions must be reduced to 15 tons by 2018.

Coal-fired steam generating units used in power plants typically have an assortment of air pollution control (APC) devices installed for reducing nitrogen oxides (NOx), sulfur oxides (SOx), and particulate emissions. In this regard, selective catalytic reduction (SCR) systems are used for NOx reductions. Spray dry absorbers (SDA) and wet flue gas desulfurization (FGD) systems are used for SOx reductions. Electo-static precipitators (ESPs) and fabric filters (FF) are used for reducing particulate emissions. Tests have shown that each of these devices or combinations of these devices are capable of removing or enhancing the removal of some portion of mercury from the flue gas.

Mercury appears in three forms in the flue gas from a coal-fired steam generating unit: elemental mercury, particulate bound mercury and oxidized mercury. The relative proportions of these three forms of mercury are referred to as the speciation.

The speciation of mercury depends upon the coal characteristics, fly ash properties, APC equipment configuration and other factors. Initially, as the coal is combusted at a high temperature in the furnace of the steam generating unit, the mercury is freed to a gaseous state. As the gas cools, a portion of the mercury oxidizes, into oxides such as into mercuric chloride, $HgCl_2$, and a portion of oxidized or elemental mercury binds to the fly ash (particulate bound mercury).

In general, the speciation of the mercury is highly dependent upon the type of coal used for combustion. For example, a steam generating unit that burns bituminous coal typically average only 7% elemental mercury at the inlet of ESPs while those burning subbituminous average 70% elemental mercury at the inlet of ESPs.

The speciation of the mercury is an important factor in determining the amount of mercury that can be efficiently removed using currently installed APC equipment. Particulate bound mercury can be removed using ESPs and Fabric Filters. Since a common form of oxidized mercury, $HgCl_2$, is water soluble, it can be efficiently removed by wet FGD systems. Mercury is also bound by fly ash and is also removed in the ESP and FF. SCRs can in many cases oxidize mercury such that it can be removed by other APC equipment. However, elemental mercury is not as readily captured by conventional APC equipment.

Continuous emission monitoring systems (CEMs) are available for on-line measurement of both total mercury emissions and elemental mercury emissions of a steam generating plant. In one common type of CEM, the mercury is measured by extracting hot filtered flue gas and transporting it using a heated line to a CEM module. The sampled gas is split into two streams for measurement of (a) elemental mercury and (b) total mercury. In the total mercury stream, the oxidized mercury is converted back to elemental mercury. In the elemental mercury stream, the oxidized mercury is removed. Using a common sensor, the resulting mercury can be used to measure the mercury in both streams, and thus determine the total and elemental levels of mercury in the flue gas.

Since particulate bound mercury and oxidized mercury are easier to remove than elemental mercury using standard APC equipment, the prior art has focused on various approaches for adsorbing mercury to carbon matter and/or oxidizing mercury.

One approach to oxidizing and/or adsorbing mercury to particulate matter is through the introduction of sorbents into the flue gas stream prior to an ESP or fabric filter. U.S. Pat. No. 3,662,523 to Revoir et al. (issued May 16, 1972) teaches a method for reducing mercury emissions by allowing the flue gas to flow through a fixed sorbent bed that is composed of activated carbon that has been chemically enhanced with halogen compounds. U.S. Pat. No. 4,889,698 to Moller et al. (issued Dec. 26, 1989) teaches the use of injecting activated carbon as a fine powder which is suspended in the flue gas stream and subsequently removed together with the particulate material formed by a spray dry absorption process. U.S. Pat. No. 5,672,323 to Bhat et al. (issued Sep. 30, 1997) teaches the injection of the combination of activated carbon and recycled fly ash prior to the ESP or wet FGD for removal of mercury. U.S. Pat. No. 6,818,043 to Chang et al. (issued Nov. 16, 2004) teaches a method of finely grinding a powdered adsorbent in a wet slurry and treating the resulting slurry with chemical additives to improve mercury removal capabilities of the sorbent. In general, the foregoing approaches require large amounts of sorbent which results in a significant increase in the cost of operating a steam generating unit. In addition, the injection of sorbents often leads to contamination of fly-ash. Because the fly-ash is often sold for other applications (e.g., the manufacture of cement and wall board), contamination can result in making the fly-ash unusable in these other applications. Consequently, the fly-ash may need to be disposed of in a landfill rather than sold.

Another method of improving mercury removal is through the injection of halogens (such as chlorine or bromine) into the flue gas stream. It has been observed that coal with high chlorine content tends to produce flue gas with a greater proportion of oxidized mercury than coal with low chlorine content. In general, bituminous coal has higher chlorine content than subbituminous coal, partially explaining the tendency for higher levels of oxidized mercury in flue gas from steam generating plants using bituminous coal. U.S. Pat. No. 4,729,882 to Ide et al. (issued Mar. 8, 1988) teaches a method of adding chlorine material into the combustion process to facilitate the oxidation of mercury. Similarly, U.S. Pat. No. 5,435,980 to Felsvang et al. (issued Jul. 25, 1995) teaches that mercury oxidation can be increased by introducing in chlorine based salts into the dry absorption zone of an SDA. U.S. Pat. No. 6,878,358 to Vosteen et al. (issued Apr. 12, 2005) teaches that injected bromine compounds oxidize mercury more effectively than chlorine compounds under the given conditions of high temperature and high sulfur content commonly observed in coal-fired steam generating units. A disadvantage of injecting chlorine and bromine (halogen) compounds into the flue gas stream is the potentially corrosive effects on the furnace, boiler, duct work, APC equipment and/or on the stack equipment. In addition, typically large amounts of halogen compounds must be injected at a potentially significant additional operational cost.

Still another approach to reducing mercury emissions is through modification of the combustion process. U.S. Pat. No. 6,863,005 to Lanier et al. (issued Mar. 8, 2005) teaches that combustion modifications such as overfire air (OFA), low NOx burners (LNB), reburning, and advanced reburning affect the amount of carbon in fly ash content. This patent describes a method for combining a variety of combustion modifications with an ash burnout system to increase carbon in ash and subsequently reduce elemental mercury. Similarly, U.S. Pat. No. 6,895,875 to Lissianski et al. (issued May 24, 2005) teaches several combustion configurations. Once again, the method includes collecting the fly ash with adsorbed mercury in a combustion waste treatment system. The disadvantage of the approaches described in these patents is that costly combustion modifications must be implemented. In addition, the resulting fly ash may not be saleable due to the high content of carbon.

Since the carbon content of the fly ash significantly affects the adsorption and oxidation of mercury as well as the usefulness of the fly ash in other applications such as the manufacturing of cement and wall board, on-line measurement of the carbon content, also known as carbon in ash (CIA), is beneficial. U.S. Pat. No. 5,729,470 to Baier et al. (issued Mar. 17, 1998) teaches a method for using a microwave based system for measuring the carbon content of fly ash in situ and in real-time from the flue gas of a coal-fired steam generating unit. Although the approach is useful for determining carbon content, the instrument is expensive and therefore not commonly used in the utility industry.

The present invention provides a system that overcomes the abovementioned drawbacks of the prior art, and provides advantages over the prior art approaches to controlling and estimating mercury emissions.

SUMMARY OF THE INVENTION

In accordance with the present invention, there is provided a model for predicting mercury emissions produced by a fossil fuel fired steam generating unit, the model comprising: a plurality of inputs for receiving input values for manipulated variables and disturbance variables associated with the steam generating unit; and at least one output for outputting at least one output value indicative of mercury emitted by said steam generating unit in accordance with the input values for the manipulated variables and the disturbance variables, wherein said model communicates said at least one output value to control means for controlling operation of said steam generating unit in accordance therewith.

In accordance with another aspect of the present invention, there is provided a system for controlling operation of a fossil fuel fired steam generating unit, the system comprising: a model of the steam generating unit for predicting mercury emissions of the steam generating unit, said model comprising: (a) a plurality of inputs for receiving input values for manipulated variables and disturbance variables associated with the steam generating unit, and (b) at least one output for outputting at least one output value indicative of mercury emitted by said steam generating unit in accordance with the input values; and control means using the model to control operation of the steam generating unit.

In accordance with still another aspect of the present invention, there is provided a method for controlling mercury emissions produced by a fossil fuel fired steam generating unit, the method comprising: generating input values for manipulated variables and disturbance variables associated with the steam generating unit; inputting the input values into a model of said steam generating unit for predicting mercury emissions, said model generating at least one output value indicative of mercury emissions produced by said steam generating unit in accordance with the input values; and outputting the at least one output value to a control means for controlling operation of said steam generating unit in accordance therewith.

In accordance with yet another aspect of the present invention, there is provided a method for controlling operation of a fossil fuel fired steam generating unit, the method comprising: generating a model of the steam generating unit for predicting mercury emissions of the steam generating unit, said model receiving input values for manipulated variables and disturbance variables associated with the steam generating unit, and outputting at least one output value indicative of mercury emitted by said steam generating unit in accordance with the input values; determining optimal input values for the manipulated variables using the model; and controlling operation of the steam generating unit using the optimal input values for the manipulated variables.

An advantage of the present invention is the provision of a system for mercury emission control that is more cost effective than existing systems for controlling mercury emissions.

Another advantage of the present invention is the provision of a system for mercury emission control that does not result in contamination of the fly ash such that it cannot be sold for other applications.

Still another advantage of the present invention is the provision of a system for mercury emission control that does not result in corrosion of plant equipment.

Still another advantage of the present invention is the provision of a system for mercury emission control that efficiently reduces elemental or total mercury from the flue gas of a coal-fired steam generating unit.

Yet another advantage of the present invention is the provision of a virtual mercury sensor for estimating mercury emissions at a predetermined location of a steam generating unit.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

It should be understood that the various systems described in the illustrated embodiments of the present invention may take the form of computer hardware, computer software, or combinations thereof. The computer hardware may take the form of a conventional computer system including a processor, data storage devices, input devices (e.g., keyboard, mouse, touch screen and the like), and output devices (e.g., display devices such as monitors and printers), or be embodied as part of another computer system.

The present invention will be described herein with reference to a steam generating plant used in connection with an electric power generating application. It should be appreciated that the present invention is applicable to steam generating plants used for the production of steam in connection with other applications, including but not limited to, steam heating.

Steam Generating Unit

Figure 1:
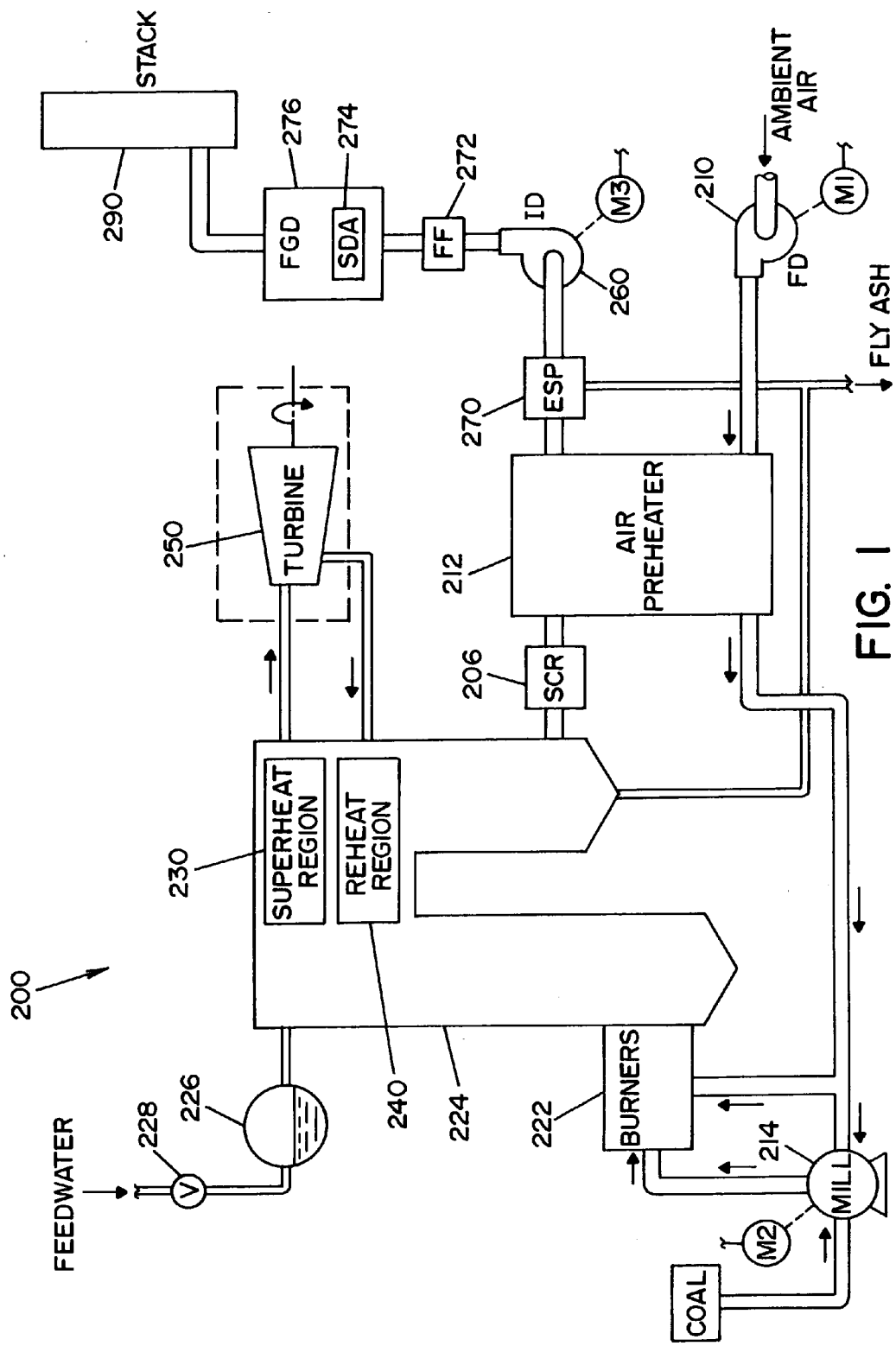
FIG. 1 shows a simplified schematic of a typical coal-fired steam generating unit used in a power generating application.

The main components of a typical coal-fired steam generating unit 200 will now be briefly described with reference to FIG. 1. Steam generating unit 200 includes one or more forced draft (FD) fans 210 that are powered by motors M1. Forced draft fans 210 supply air to mills 214 and to burners 222, via an air preheater 212. Ambient air is heated as it passes through air preheater 212. Mills 214 include pulverizers that are powered by motors M2. The pulverizers grind coal (or other fuel) into small particles (i.e., powder). The air received by the mills from forced draft fans 210 is used to dry and carry the coal particles to burners 222. Air from forced draft fans 210 that is supplied to burners 222, via air preheater 212, facilitates combustion of the coal at furnace 224. Hot flue gas is drawn out of furnace 224 by one or more induced draft (ID) fans 260, and delivered to the atmosphere though a chimney or stack 290. Induced draft fans 260 are powered by motors M3. Water is supplied to a drum 226 by control of a feedwater valve 228. The water in drum 226 is heated by furnace 224 to produce steam. This steam is further heated in a superheat region 230 by a superheater (not shown). A superheater spray unit (not shown) can introduce a small amount of water to control the temperature of the superheated steam. A temperature sensor (not shown) provides a signal indicative of the sensed temperature of the superheated steam. In the embodiment shown, steam generating unit 200 is used in an electric power generating application. Accordingly, the superheated steam produced by steam generating unit 200 is supplied to a turbine 250 that is used to produce electricity. Steam received by the turbine is reused by circulating the steam through a reheater (not shown) that reheats the steam in a reheat region 240. A reheater spray unit (not shown) can introduce a small amount of water to control the temperature of the reheated steam. A temperature sensor (not shown) provides a signal indicative of the sensed temperature of the reheated steam.

A "boiler" includes, but is not limited to, burners 222, furnace 224, drum 226, superheater, superheater spray unit, reheater, reheater spray unit, mills 214, and a boiler economizer (not shown). The boiler economizer recovers "waste heat" from the boiler's hot stack gas and transfers this heat to the boiler's feedwater.

Soot cleaning devices (not shown), include but are not limited to, sootblowers, water lances, and water cannons or hydro-jets. Soot cleaning devices use steam, water or air to dislodge deposits, such as slag, and clean surfaces throughout various locations in the boiler. Soot cleaning is required to maintain performance and efficiency of steam generating unit 200. The number of soot cleaning devices on a given steam generating unit can range from several to over a hundred. Furthermore, the soot cleaning devices may be grouped together by location (e.g., zones in the boiler). Each group of soot cleaning devices may be comprised of one or more soot cleaning devices. For example, a boiler may have eight (8) soot cleaning device groups, each group comprising five (5) individual soot cleaning devices.

In addition, steam generating unit 200 includes some form of post-combustion air pollution control (APC) equipment for removing pollutants from the flue gas. The APC equipment may include, but is not limited to, a selective catalytic reactor (SCR) 206, an electro-static precipitator (ESP) 270, a fabric filter (FF) 272, a spray dry absorber (SDA) 274, and a wet flue gas desulfurization (FGD) system 276.

It should be understood that a typical steam generating unit also includes additional components well known to those skilled in the art, including, but not limited to, tubes for carrying fluids, valves, dampers, windbox, sensing devices for sensing a wide variety of system parameters (e.g., temperature, pressure, flow rate, and flue gas components), and actuators for actuating components such as valves and dampers.

Optimization of Mercury Oxidation

Figure 2:
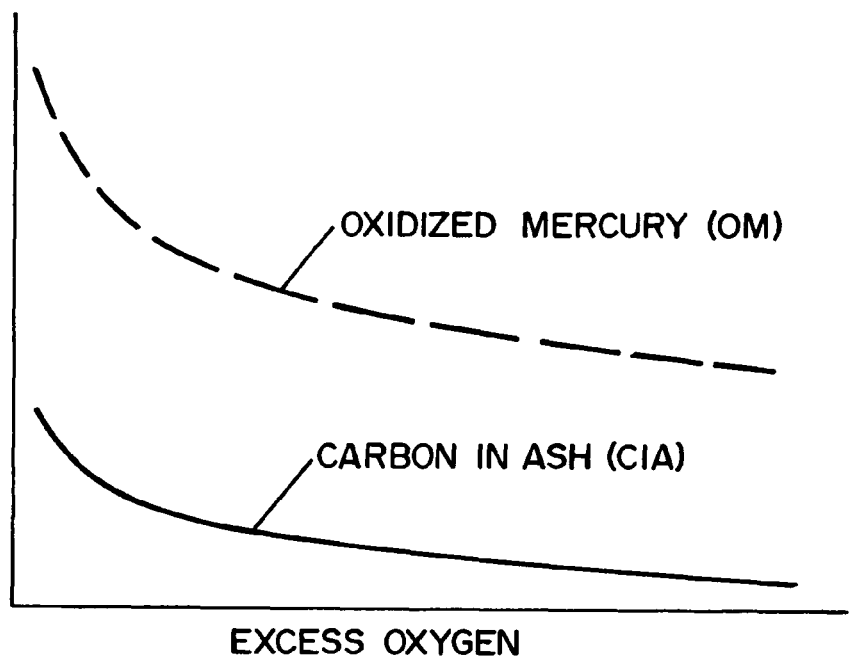
FIG. 2 shows oxidized mercury and carbon in ash (CIA) formation as a function of excess oxygen in a typical furnace of a steam generating unit.

FIG. 2 shows oxidized mercury (OM) and carbon in ash (CIA) as a function of excess oxygen in a typical steam generating unit that is fired by bituminous coal. As the amount of excess oxygen increases, both oxidized mercury and CIA levels decrease. Similarly, as the amount of excess oxygen decreases, oxidized mercury and CIA levels increase.

To maximize oxidized mercury production, excess oxygen needs to be decreased. However, due to the desire to sell fly ash, it is highly desirable to put an upper limit upon the level of acceptable CIA. To comply with constraints on the CIA level, it is necessary to limit the reduction in excess oxygen. Consequently, the level of oxidized mercury production is also limited.

The problem of maximizing mercury oxidation is made more challenging because the curves shown in FIG. 2 are constantly shifting due to disturbances such as changes in fuel characteristics, boiler conditions, mill conditions, and ambient conditions. For example, changes in the amount of mercury in the fuel supply will cause the oxidation curve to move up and down. The CIA shifts to the right and left due to changes in mill conditions and changes in fuel characteristics.

Since the curves in FIG. 2 are constantly shifting for a given load, it is not possible to determine a single optimal setpoint for excess oxygen to maximize mercury oxidation and maintain CIA below a specified limit at a given load. Furthermore, as the load changes, it is not possible to determine a single optimal curve for excess oxygen as a function of load.

Since it is not possible to determine a single curve to maximize mercury oxidation while observing the constraint upon CIA, operators of a steam generating plant usually choose to focus upon determining a single curve that will guarantee that the CIA limit will be met. Using this approach, the CIA limit is observed, but mercury oxidation is not maximized.

To maximize mercury oxidation, a system is needed that recognizes the current operating conditions of the furnace and constantly updates the excess oxygen setpoint based upon these conditions. Instead of using a fixed curve that is a function of load, the curve is constantly recomputed based upon a known model of the process and current operating conditions of the steam generating unit.

It should be noted that mercury oxidation and CIA production are a function of many setpoints in addition to excess oxygen. In a tangentially-fired ("T-fired") boiler, excess oxygen, over-fire air damper positions and tilts, fuel biases, windbox to furnace differential pressure (WFDP) and burner tilts all affect the levels of mercury oxidation and CIA. As used herein, the term manipulated variables (MV) refers to variables associated with steam generating unit 200 that can be changed by an operator. To maximize mercury oxidation levels while observing CIA limits, the setpoints for all these manipulated variables must be constantly updated.

In addition, changing setpoints for all the manipulated variables affect other important characteristics of the steam generating unit such as flue gas exit temperature, reheat temperature and superheat temperature. As used herein, the term controlled variables (CV) refers to the output set of variables (associated with steam generating unit 200) that are affected by the manipulated variables (MV). Therefore, the effects of changing the manipulated variables on the complete set of controlled variables must be taken into account in maximizing mercury oxidation. Examples of controlled variables relating to mercury emissions include, but are not limited to, total mercury emissions, oxidized mercury emissions, elemental mercury emissions, and particulate mercury emissions.

Finally, because boiler conditions can significantly change in less than a minute due to disturbance such as changes in fuel characteristics, it may be advantageous to constantly update the setpoints of the manipulated variables at relatively short time intervals (e.g., every 10-30 seconds) for all the manipulated variables to guarantee optimal performance. Thus, an optimization system that incorporates a model of the furnace that is updated frequently (e.g., every 10-30 seconds) may be needed to maximize mercury oxidation. A combustion optimization system according to a preferred embodiment of the present invention will now be described in detail.

Optimization System

Figure 3:
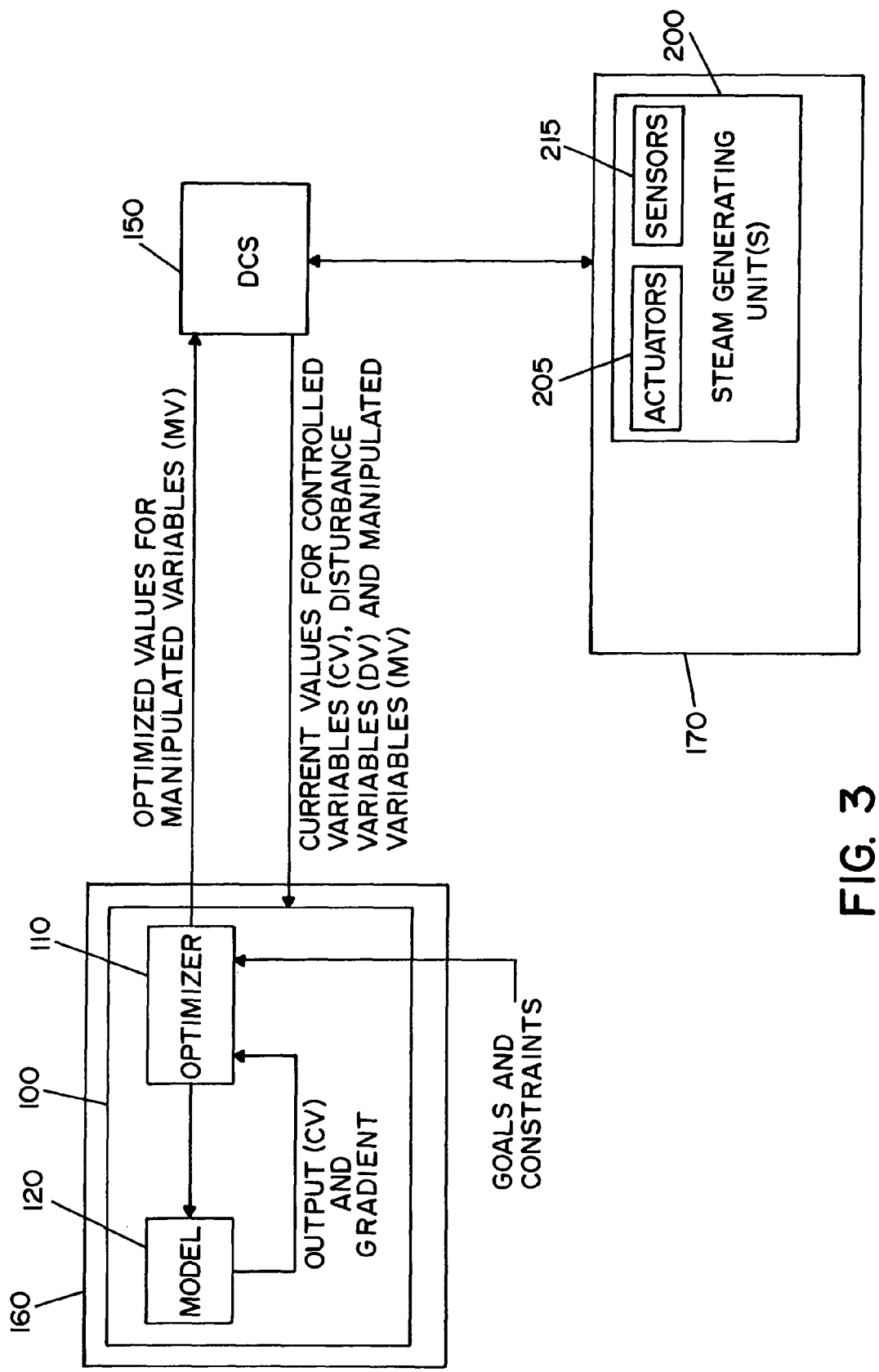
FIG. 3 illustrates an optimization system connected with a distributed control system (DCS) for controlling operation of a steam generating plant.

FIG. 3 illustrates a block diagram of an optimization system 100. In the illustrated embodiment, optimization system 100 is comprised of an optimizer 110 and a model 120. Optimizer 110 and model 120 are both described in greater detail below. In accordance with an illustrated embodiment, optimization system 100 may form part of a supervisory controller 160 that communicates with a DCS 150. DCS 150 is a computer-based control system that provides regulatory control of a steam generating plant 170. Supervisory controller 160 is a computer system that provides supervisory control data to DCS 150. It should be understood that in an alternative embodiment, model 120 may reside on a different computer system than optimizer 110.

An operator interface (not shown) provides means for an operator to communicate with DCS 150. DCS 150 may also communicate with a historian (not shown).

Plant 170 includes one or more steam generating units 200. Each steam generating unit 200 includes a plurality of actuators 205 and sensors 215. Actuators 205 includes devices for actuating components such as valves and dampers. Sensors 215 include devices for sensing various system parameters (e.g., temperature, pressure, flow rate, and flue gas components).

Model 120 is used to represent the relationship between (a) manipulated variables (MV) and disturbance variables (DV) and (b) controlled variables (CV). As used herein, disturbance variables refers to variables (associated with steam generating unit 200) that affect the controlled variables, but cannot be manipulated by an operator (e.g., ambient conditions, characteristics of the coal, etc.). Optimizer 110 determines an optimal set of setpoint values for the manipulated variables given (1) a desired goal associated with operation of the steam generating unit (e.g., maximizing oxidized mercury) and (2) constraints associated with operation of the steam generating unit. By way of example, and not limitation, the constraints may include a carbon in ash (CIA) limit for fly ash generated by the steam generating unit, a CO emissions limit of the steam generating unit, a NOx emissions limit of said steam generating unit, and a mercury emissions limit of said steam generating unit.

At a predetermined frequency (e.g., every 10-30 seconds), optimization system 100 obtains the current values of manipulated variables, controlled variables and disturbance variables from DCS 150. An "optimization cycle" commences each time the current values for the manipulated variables, controlled variables and disturbance variables are read out from DCS 150.

As will be described in further detail below, optimization system 100 uses model 120 to determine an optimal set of setpoint values for the manipulated variables based upon current conditions of steam generating unit 200. The optimal set of setpoint values are sent to DCS 150. An operator of plant 170 has the option of using the optimal set of setpoint values for the manipulated variables. In most cases, the operator allows the computed optimal set of setpoint values for the manipulated variables to be used as setpoints values for control loops. Optimization system 100 runs in a closed loop adjusting the setpoints values of the manipulated variables at a predetermined frequency (e.g., every 10-30 seconds) depending upon current operating conditions of steam generating unit 200.

Neural Network Based Dynamic Model

To properly capture the relationship between the manipulated/disturbance variables and the controlled variables, model 120 must have the following characteristics:

Nonlinearity: A nonlinear model is capable of representing a curve rather than a straight line relationship between manipulated/disturbance and controlled variables. For example, a nonlinear, curved relationship is often observed between over-fire air dampers and oxidized mercury.

Multiple Input Multiple Output (MIMO): The model must be capable of capturing the relationships between multiple inputs (manipulated/disturbance variables) and multiple outputs (controlled variables).

Dynamic: Changes in the inputs do not instantaneously affect the outputs. Rather there is a time delay and follow by a dynamic response to the changes. It may take 15-30 minutes for changes in the inputs to fully propagate through the system. Since optimization systems execute at a predetermined frequency (e.g., an optimization cycle commencing every 10-30 seconds), the model must represent the effects of these changes over time and take them into account.

Adaptive: The model can be updated at the beginning of each optimization cycle (e.g., every 10-30 seconds) to reflect the current operating conditions of the steam generating unit.

Derived from Empirical Data: Since each boiler is unique, the model must be derived from empirical data obtained from the steam generating unit.

Given the foregoing requirements, a neural network based approach is presently the preferred technology for implementing models in accordance with the present invention. Neural networks are developed based upon empirical data using advanced regression algorithms. See C. Bishop, *Neural Networks for Pattern Recognition*, Clarendon Press, Oxford, U.K., 1995, fully incorporated herein by reference. Neural networks are capable of capturing the nonlinearity commonly exhibited by boilers. Neural networks can also be used to represent systems with multiple inputs and outputs. In addition, neural networks can be updated using either feedback biasing or on-line adaptive learning.

Dynamic models can also be implemented in a neural network based structure. A variety of different types of model architectures have been used for implementation of dynamic neural networks, as described in S. Piche, "Steepest descent algorithms for neural network controllers and filters," *IEEE Trans. Neural Networks*, vol. 5, no. 2, pp. 198-212, 1994 and A. Barto, "Connectionist Learning for Control", Neural Networks for Control, edited by Miller, W., Sutton, R. and Werbos, P., MIT Press, pp 5-58, 1990, both of which are fully incorporated herein by reference. Many of the neural network model architectures require a large amount of data to successfully train the dynamic neural network. A novel neural network structure, which may be trained using a relatively small amount of data, was developed in the late 1990's. Complete details on this dynamic neural network based structure are provided in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

Given a model of a steam generating unit, it is possible to compute the effects of changes in the manipulated variables on the controlled variables. Furthermore, since the model is dynamic, it is possible to compute the effects of changes in the manipulated variables over a future time horizon (i.e., multiple changes rather than a single change).

Given that a relationship between inputs and outputs is well represented by the model described above, it will now be described how setpoint values for inputs (i.e., manipulated variables) can be determined to achieve desired goals while also observing the constraints.

Optimizer

An optimizer is used to minimize a "cost function" subject to a set of constraints. The cost function is a mathematical representation of a desired goal or goals. For instance, to maximize mercury oxidation, the cost function includes a term that decreases as the level of mercury oxidation increases. One common method for minimizing a cost function is known as "gradient descent optimization." Gradient descent is an optimization algorithm that approaches a local minimum of a function by taking steps proportional to the negative of the gradient (or the approximate gradient) of the function at the current point.

Since the model is dynamic, the effects of changes must be taken into account over a future time horizon. Therefore, the cost function includes terms over a future horizon, typically one hour for "combustion" optimization. Since the model is used to predict over a time horizon, this approach is commonly referred to as model predictive control (MPC). Model Predictive Control is described in detail in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

Constraints may be placed upon both the inputs (MVs) and outputs (CVs) of the steam generating unit over the future time horizon. Typically, constraints that are consistent with limits associated with the DCS are placed upon the manipulated variables. Constraints on the outputs (CVs) are determined by the problem that is being solved. As mentioned previously, constraints may be placed on the values of CIA over the time horizon.

A nonlinear model can be used to determine the relationship between the inputs and outputs of a steam generating unit. Accordingly, a nonlinear programming optimizer is used to solve the optimization problem in accordance with this embodiment of the present invention. More details on the formulation of the cost function and constraints are provided in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

However, it should be understood that a number of different optimization techniques may be used depending on the form of the model and the costs and constraints. For example, it is contemplated that the present invention may be implemented by using, individually or in combination, a variety of different types of optimization approaches. These optimization approaches include, but not limited to, mixed integer non-linear programs (NLPs), stochastic programming, global NLPs, genetic algorithms, and particle/swarm techniques.

The optimizer computes the full trajectory of manipulated variable moves over the future time horizon, typically one hour. For an optimization system that executes every 30 seconds, 120 values are computed over a one hour future time horizon for each manipulated variable. Since the model or goals/constraints may change before the next optimization cycle, only the first value in the time horizon for each manipulated variable is output by the optimization system to the DCS as a setpoint value for each respective manipulated variable.

At the next optimization cycle, the model is updated based upon the current conditions of the steam generating unit. The cost function and constraints are updated if they have changed. Typically, the cost function and constraints are not changed. The optimizer is used to recompute the set of values for the manipulated variables over the time horizon and the first value in the time horizon, for each manipulated variable, is output to the DCS as the setpoint value for each respective manipulated variable. The optimization system repeats this process for each optimization cycle, thus constantly maximizing mercury oxidation and maintaining CIA below the required limit as the steam generating unit is affected by changes in such items as load, ambient conditions, boiler conditions, and fuel characteristics.

By way of example, and not limitation, a cost function may include at least one of the following: a predicted value for a controlled variable indicative of NOx emissions of the steam generating unit; a predicted value indicative of mercury emissions of the steam generating unit; and a predicted value indicative of boiler efficiency of the steam generating unit.

Instead of directly controlling the steam generating unit, in an alternative embodiment of the present invention, the values for the manipulated variables determined by the optimization system may be sent to the DCS, where they are viewed by an operator or engineer. The operator or engineer then determines setpoint values for the manipulated variables based upon the results of the optimization. In this case, the optimization system operates as an advisor to the operator or engineer.

Finally, the optimization system may also be implemented on an off-line simulation of the steam generating unit rather than directly connected to the steam generating unit. Based upon the results of the off-line simulation, the operators or engineers may determine new operating procedures for setting values for the manipulated variables of the steam generating unit.

Mercury Oxidation Mechanisms

As discussed above, advanced optimization approaches can be used to maximize mercury oxidation. The influence of optimization on mercury oxidation will now be described in detail.

Results presented in K. Schofield, "Let Them Eat Fish: Hold the Mercury," Chemical Physics Letters, 386, pp. 65-69, 2004, which is fully incorporated herein by reference, confirms the importance of heterogeneous chemistry in the oxidation of mercury. All coals have both elemental and oxidized forms of mercury. Levels of desired species of mercury are elevated through combustion and post-combustion processes. Data shows a wide variation in oxidation in the flue gas stream. Such variation directly implies that there are controllable influences that can be imposed at the source creation point of the flue gas stream. If it is known what to influence early on in the combustion process, then the specialization of the flue gas can be influenced, and all downstream systems can eliminate the easily oxidized versions of the mercury.

The critical factors for oxidation of mercury include proximity of compounds reacting with mercury, residence time of the mercury within a reaction temperature zone, and the presence of surface structures as they relate to the conversion reactions. The importance of maximizing these reactions in low ranked coals with minimal oxidants is obvious. However, even though there are relatively low concentrations of chlorine or other oxidants in lower ranked coal, it must be noted that concentrations are still thousands of times greater than the concentration of mercury in the flue gas stream.

To improve mercury oxidation, optimization may be used to improve reaction sites and conditions for the reaction. Thus, optimization may be used to improve the characteristics of the fly ash, as well as improving the reaction zone by controlling temperature.

In addition, it has been shown that large surfaces also have a significant influence on mercury oxidation. These surfaces serve as secondary reaction sites. These surface reactions may occur on high density surface structures such as the air preheater, duct impingement areas (e.g., ducts connecting the air preheater with the ESP), and the ESP. Optimization can be used to facilitate these surface reactions by controlling the temperatures within the areas containing high density surface structures, such as the air preheater.

Role of Temperature in Mercury Oxidation

Temperature is a significant factor in the oxidation of mercury. Mercury has no stable solid or gaseous molecules above the temperature of 700 degrees C. (1292 degrees F.). For this reason, gas in the furnace contains a high proportion of atomic mercury. Therefore, any reaction that results in mercury oxidation must take place at lower temperatures downstream of the furnace. Oxidation reactions have been shown by test to primarily occur in the temperature range of 150 to 300 degrees C. (302 to 572 degrees F.).

Surface reactions can take place on solids that include metal surfaces, such as duct walls and exchange surfaces of the air preheater. Likewise, surface reactions can occur on materials in transit such as carbon and fly ash. Given that the reaction rate is also surface dependent, then optimal conversion should take place near turbulent surfaces. The gas density of Hg, S, Cl, and fly ash are all contributors to the probability of the reaction taking place within the short transient time that the chemicals spend within the desired temperature range within a parallel gas stream.

Air preheaters have gas inlet temperatures which are typically around 420 degrees C. (790 deg F.). The gas outlet temperature of air preheaters is typically 162C (325 deg F.). These temperatures are near the temperature range required for oxidation of mercury. In addition, the temperature between the air preheater and the ESP is often within the range of desired temperatures for oxidation of mercury.

Intelligent Sootblowing for Mercury Emission Reduction

Optimizing sootblowing within the boiler alters the efficiency (i.e., "heat rate") of the steam generating unit, as well as NOx formation. Optimizing sootblowing also has a significant effect on the oxidation of mercury. In this regard, steam based sootblowing introduces turbulent $H_2O$ into the gas stream upstream of the air preheaters and affects the furnace exit gas temperature. Sootblowing also affects the characteristics of particulate matter. As used herein, the term "sootblowing" also includes soot cleaning operations using other types of devices (e.g., water lances, and water cannons or sonic devices).

When a wall or upper pass of the boiler is blown using sootblowing equipment, particles that become entrained into the flue gas will affect particle characteristics in the gas downstream. The particle type and chemical makeup of the ash re-introduced into the flue gas stream is altered from its original state.

Sootblowing also directly affects the furnace exit gas temperature (FEGT). By changing FEGT, the location of the critical temperature zone for surface reactions is shifted. For example, cleaning a boiler may change the temperature in the region of the air preheater by 16 to 32 degrees C. (30 to 60 degrees F.). Since surface reactions occur more readily at lower temperatures, sootblowing can be used to increase mercury oxidation, especially for tubular air preheaters.

Managing sootblowing in an intelligent manner allows for optimization of particle size and quantity introduced into the flue gas steam. It also is used to manage the flue gas stream temperatures to increase the probability of surface reactions. In addition, managing flue gas stream temperatures also can be used to decrease temperatures between the air preheater and ESP, thus, increasing reactions that occur on fly ash.

U.S. patent application Ser. No. 11/053,734, entitled "Method and Apparatus for Optimizing Operation of a Power Generating Plant Using Artificial Intelligence Techniques", filed Feb. 8, 2005, which is fully incorporated herein by reference, describes an invention for intelligently controlling operation of sootblowers in a power plant. The present invention can be used to manage sootblowing for particle size and flue gas temperature in order to increase the oxidation of mercury.

Mercury Emissions Model

It should be understood that while the present invention will be described herein with reference to models in the form of neural network based models, it is contemplated that the present invention may be implemented using other types of models, including but not limited to, an empirically developed model, a model based upon heuristics, or a model developed using "first principles" knowledge. A model that is developed using known physical equations is referred to as a model developed using "first principles" knowledge.

As discussed above, optimization system 100 (FIG. 3) includes a model 120. In one embodiment of the present invention, model 120 may include model 120A (FIG. 4) for predicting mercury emissions of steam generating unit 200 (e.g., a typical T-fired steam generating unit). In the illustrated embodiment model 120A provides a prediction of total mercury and elemental mercury emissions of steam generating unit 200. The level of oxidized mercury emissions of the steam generating unit is obtained by subtracting the elemental mercury emissions from the total mercury emissions. It should be understood that the mercury emissions determined by model 120A are associated with a particular location in steam generating unit (e.g., between air preheater 212 and ESP 270, between ESP 270 and FGD 276, and at stack 290).

The manipulated variable (MV) inputs to model 120A, which are obtained from DCS 150, may typically include the following: the level of excess oxygen in the flue gas, the over-fire air (OFA) damper positions, the windbox-to-furnace differential pressure (WFDP), biases to each of the mills, operational state of various sootblowers (or other soot cleaning devices), and the burner tilt angles. The disturbance variable (DV) inputs to model 120A may typically include the following: coal characteristics (such as ash content, volatile matter, moisture content, viscosity, constituent minerals, and BTU content), fineness of the mill grind, and load demand. It should be appreciated that the manipulated variables and disturbance variables are not limited to those discussed above. For example, additional manipulated variables such as the blending of two or more types of coal as fuel for the steam generating unit or the blending of coal with an additive, such as a halogen, may also be included in model 120A if desired. By blending coals and potentially additives, optimization system 100 may be used to control the chemical composition of the fuel. The above-identified manipulated variables and disturbance variables for illustrated model 120A will now be briefly described.

"Excess oxygen" refers to the percentage amount of excess oxygen introduced into the furnace above that required for full combustion of the fuel. As the amount of excess oxygen increases, the boiler operates in an air rich environment. Oxidized mercury is reduced by increasing the amount of excess oxygen.

With respect to the "over-fire air (OFA) damper," over-fire air is introduced above the combustion zone in a furnace in order to reduce CO emissions and lower NOx emissions. The amount of over-fire air is controlled by the position of a damper. Increasing over-fire air usually increases carbon in ash; thus, correspondingly, increasing over-fire air usually increases oxidized mercury.

The "windbox to furnace differential pressure (WFDP)" controls the rate of secondary air entry into the boiler. (The primary air is used to transport the coal into the furnace through the burner.) The secondary air often affects the location of the combustion within the furnace.

With respect to "mill bias," mills are used to grind the coal before the primary air transports the coal dust into the furnace through the burner. The amount of coal ground by each mill is determined primarily by load. However, it is possible to bias the amount of coal such that more or less coal is introduced at various levels. This can be used to incrementally affect the staging of combustion.

With regard to "sootblowing" (or other soot cleaning process), noncombustible components of the coal partially accumulated on the thermal transfer surfaces of the boiler. To maintain proper thermal transfer, the blowing of steam, water or air is used to clean the boiler surfaces.

As to "coal characteristic," the chemical composition of coal changes even if it is extracted from the same mine. Changes in nitrogen, sulfur, mercury and BTU content are common.

With respect to "mill grind," as described above, mills are used to grind the coal into a fine dust that can be injected into a furnace. The fineness of the grind changes over time as the mill wears.

The term "load" refers to the required steam or electrical power generation rate for a steam generating unit.

As discussed above, a neural network (NN) based mercury model can be developed using empirical data collected from the steam generating unit of interest. In this case, data representing different operating regimes of the steam generating unit is collected. The mercury data is obtained using a mercury continuous emission monitor (CEM) or other sensing device(s) which may or may not be continuous nor permanent.

The collected data is used to create a training set for developing NN model 120A. Given the data, NN model 120A may be trained or retrained using a variety of different algorithms known to those skilled in the art, such as a regression based approach including, but not limited to, a backpropagation algorithm, a conjugate gradient method, or an optimization technique. NN model 120A may take the following form:

$$c_{t+1} = NN(m_t, d_t, w) \tag{1}$$

where $c_{t+1}$ represents the vector of predicted controlled variable (CV) output values of model 120A (i.e., elemental mercury emissions and total mercury emissions) at time t+1. The function NN( ) represents NN model 120A with weight vector, w. The variables $m_t$ and $d_t$ represent the values of the manipulated and disturbance variables respectively at time t. It should be noted that the primary goal of NN model 120A is to predict the effect of a change at time t on the output at time t+1. For a model, the time interval to steady state from time t to t+1 is usually 15-60 minutes for a coal-fired boiler.

It should be noted that NN model 120A can be updated on-line by retraining using recently acquired data. NN model 120A may also be updated using feedback biasing as shown in the following equation, $$c_{t+1} = NN(m_t, d_t, w) + (z_t - c_t) \tag{2}$$

where $z_t$ is a measure of the current values of the mercury emissions (i.e., elemental mercury emissions and total mercury emissions) of the steam generating unit at time t. It should be understood that $z_t$ is a "measured value" that may be obtained from a sensor (e.g., a CEM) or from off-line lab analysis. Furthermore, $c_t$ is the prediction (i.e., "predicted value") of the mercury emissions provided by NN model 120A at time t. Thus, NN model 120A is biased by the error between an actual measured value and a predicted value.

As described in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference, a neural network model can be combined with a dynamic model to form a dynamic neural network model. Accordingly, NN model 120A may take the following form:

$$y_{t+1} = D(y_t, y_{t-1}, m_t, m_{t-1}, d_t, d_{t-1}, v) \tag{3}$$

where $y_{t+1}$ represents the vector of predicted controlled variable (CV) output values of dynamic model 120A (i.e., elemental mercury and total mercury emissions) at time t+1. For dynamic NN model 120A, the time interval from time t to t+1 is usually 15-60 seconds for a coal-fired boiler. The function D( ) represents dynamic NN model 120A with model parameter vector, v. The variables $m_t$ and $d_t$ represent the values of the manipulated and disturbance variables respectively at time t. It should be noted that dynamic NN model 120A is a function of the output at previous time intervals and is also a function of previous values of the manipulated and disturbance variables. Dynamic neural network model 120A takes the form of a second order dynamic model. It should be noted that higher order models can be used as well as tap delayed neural network type models. A future trajectory can be computed by rolling (3) forward in time as follows from time t+1, $$y_{t+1} = D(y_t, y_{t-1}, m_t, m_{t-1}, d_t, d_{t-1}, v) \tag{4}$$

$$y_{t+2} = D(y_{t+1}, y_t, m_{t+1}, m_t, d_{t+1}, d_t, v) \tag{5}$$

$$y_{t+3} = D(y_{t+2}, y_{t+1}, m_{t+2}, m_{t+1}, d_{t+2}, d_{t+1}, v) \tag{6}$$

to time t+N, $$y_{t+N} = D(y_{t+N-1}, y_{t+N-2}, m_{t+N-1}, m_{t+N-2}, d_{t+N-1}, d_{t+N-2}, v) \tag{7}$$

Feedback biasing can be used to initialize dynamic NN model 120A at time t to current operating conditions of the steam generating unit using the following approach, $$y_{t+1} = D(y_t, y_{t-1}, m_t, m_{t-1}, d_t, d_{t-1}, v) \tag{8}$$

where $z_t$ is a measure of the current values of the mercury emissions (i.e., elemental mercury and total mercury emissions) of the steam generating unit at time t. It should be understood that $z_t$ is a "measured value" that may be obtained from a sensor (e.g., a CEM) or from off-line lab analysis. Furthermore, $y_t$ is the prediction (i.e., "predicted value") of the mercury emissions provided by dynamic NN model 120A at time t. Thus, dynamic NN model 120A is biased by the error between an actual measured value and a predicted value. Similarly, for time t+2 to t+N, model 120A may also be biased by $(z_t - y_t)$ to provide a feedback biased estimate of the output values. Using this approach, an accurate model of mercury emissions is developed which is constantly updated at each iteration using feedback biasing.

Fly Ash Characteristics Model

Figure 5:
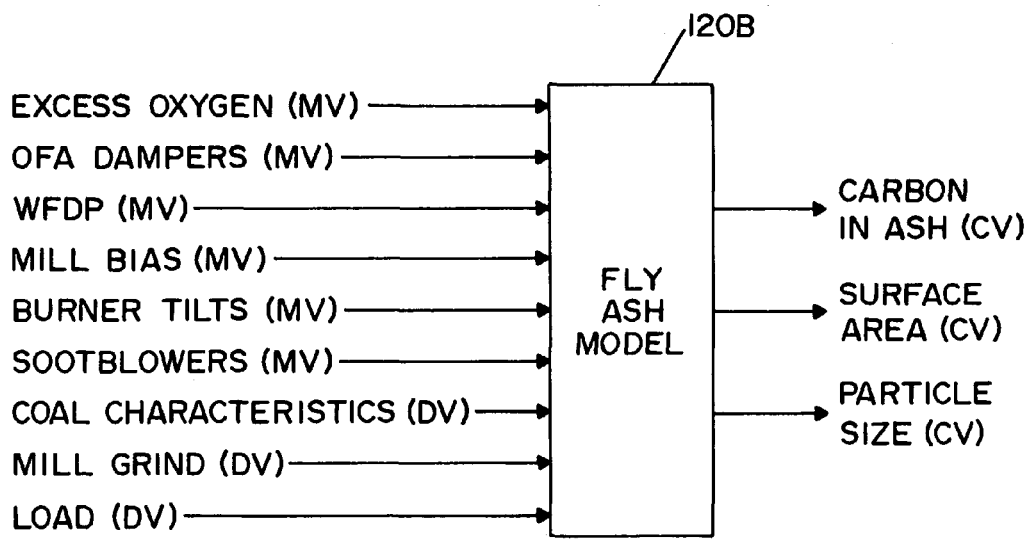
FIG. 5 illustrates a model for predicting characteristics of fly ash produced by a steam generating unit.

Model 120 (FIG. 3) may also include a model 120B for predicting fly ash characteristics (controlled variables), including, but not limited to, carbon in ash, particle surface area, particle size, and particle size distribution. One embodiment of a model 120B for predicting fly ash characteristics is shown in FIG. 5.

The abovementioned fly ash characteristics, and potentially others, are important in determining the reactivity of the fly ash with mercury. Since many of the factors that affect mercury emissions also affect fly ash characteristics, the same set of manipulated and disturbance variable inputs may be used in the model 120A for mercury emissions and model 120B for fly ash characteristics. However, it also contemplated that the respective manipulated and disturbance variable inputs for models 120A and 120B may also be different.

Model 120B for fly ash may be implemented as a steady state or dynamic neural network (NN) model in a similar manner as NN model 120A for mercury emissions. NN Model 120B may be built using empirical data from the steam generating unit. A carbon in ash (CIA) sensor may be used to collect the real-time CIA data. Particle surface area and particle size cannot be measured directly on-line. Accordingly, off-line lab analysis is performed to collect data for these variables. Using lab analysis and on-line CIA measurement data, the NN model 120B for fly ash can be trained using methods described above.

The output of NN model 120B predicting carbon in ash can be updated on-line using either feedback biasing or on-line adaptive learning based upon the CIA sensor. The outputs of NN model 120B predicting fly ash surface area and particle size can be updated when lab analysis values become available. Using this approach, an up-to-date, accurate NN model 120B of fly ash characteristics can be maintained on-line.

Additional Models

Figure 6:
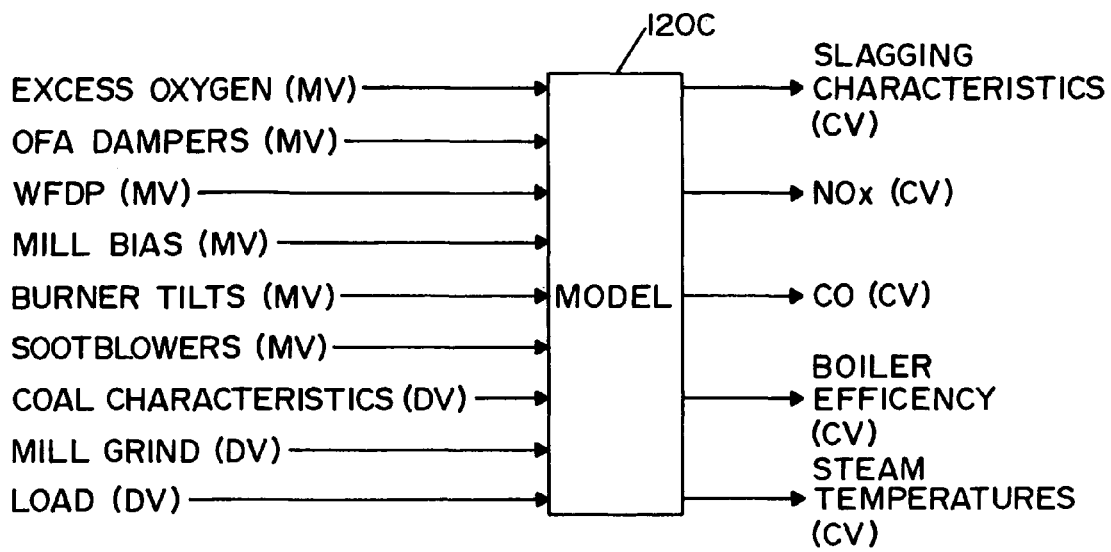
FIG. 6 illustrates a model for predicting slagging characteristics, NOx emissions, CO emissions, boiler efficiency and steam temperatures associated with a steam generating unit.

Model 120A for predicting mercury emissions (FIG. 4) and model 120B for predicting fly ash characteristics (FIG. 5) primarily use inputs that represent the fuel-to-air ratio within the boiler. Changes in the fuel-to-air ratio in the boiler not only affect mercury emissions and fly ash characteristics, but also affect additional controlled variables, including but not limited to, slagging characteristics, nitrogen oxides (NOx), carbon monoxide (CO), boiler efficiency, and steam temperatures. "Slag" refers to melted ash deposits formed on the wall of a boiler in high temperature areas. "Slagging characteristics" affect thermal characteristics of the boiler. Accordingly, it may be necessary to include a model for many of these additional controlled variables for use in model 120 of optimization system 100 of FIG. 3. FIG. 6 illustrates a model 120C for predicting several of these additional controlled variables. In a preferred embodiment, model 120C is a neural network model.

Model 120C is typically developed using historical data in the manner described above. Both steady state and dynamic versions of model 120C may be developed using empirical data. Model 120C may be updated on-line using either feedback biasing or on-line adaptive learning, since sensor or on-line calculations exist for the output controlled variables of model 120C.

Mercury Optimization

Figure 7:
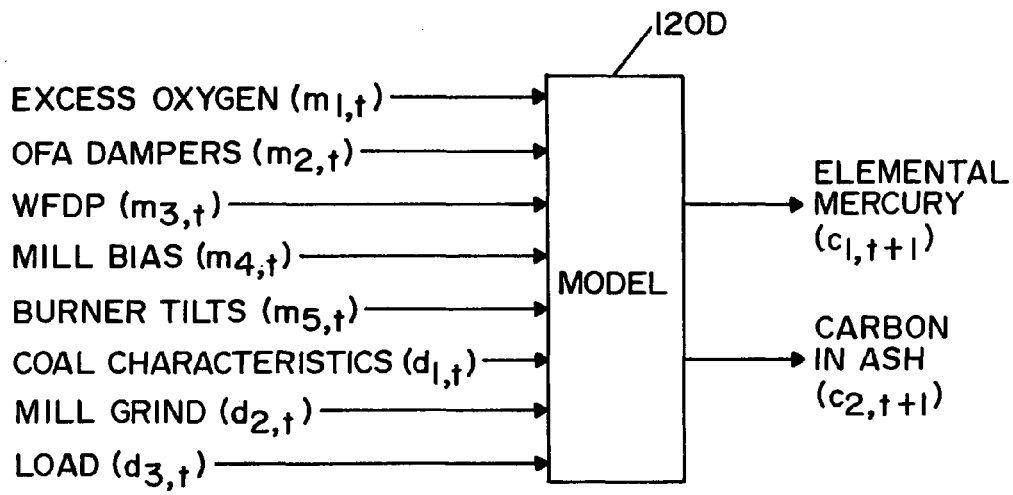
FIG. 7 illustrates a model for predicting elemental mercury emissions and carbon in ash (CIA) associated with a steam generating unit.

A first embodiment of optimization system 100 (FIG. 3) for optimization of mercury emissions will now be described. The goal of optimization system 100 of this embodiment is to determine optimal setpoint values for a set of manipulated variables, such that elemental mercury emissions is reduced while the carbon in ash is held below a specified upper limit. In this embodiment, model 120 takes the form of a steady state model 120D shown in FIG. 7. Model 120D is formed by the combination of a portion of model 120A (mercury emissions prediction) and model 120B (fly ash characteristics prediction), as described above.

A feedback biased version of the predicted elemental mercury emissions for model 120D can be represented as follows:

$$c_{1,t+1}=NN_1(m_t, d_t, w)+(z_{1,t}-c_{1,t}) \quad (9)$$

where $z_{1,t}$ is the current reading (i.e., "measured value") of elemental mercury emissions, $c_{1,t}$ is the current prediction (i.e., "predicted value") of elemental mercury emissions, and $NN_1()$ is the unbiased neural network prediction of elemental mercury at time t+1. A feedback biased version of the predicted carbon in ash for model 120D can be represented as follows:

$$c_{2,t+1}=NN_2(m_t, d_t, w)+(z_{2,t}-c_{2,t}) \quad (10)$$

where $z_{2,t}$ is the current reading (i.e., "measured value") of carbon in ash, $c_{2,t}$ is the current prediction (i.e., "predicted value") of carbon in ash, and $NN_2()$ is the unbiased neural network prediction of carbon in ash at time t+1.

Optimizer 110 (FIG. 3) preferably takes the form of a nonlinear programming (NLP) optimizer for computing the optimal set of values for manipulated variables, $m_t$. To solve for values of the manipulated variables, a cost function and set of constraints are specified. In this embodiment of the present invention, the cost function is given by the following expression:

$$J=a*c^2_{1,t+1}+b*H(c_{2,t+1}-l) \quad (11)$$

where J is the cost value of the cost function, H( ) is the heaviside function, l is the limit on carbon in ash, and a and b are tuning parameters that are great than zero. The heaviside function is equal to zero when the input, $c_{2,t+1}-l$, is less than zero, and is equal to $c_{2,t+1}-l$ when this value is greater than or equal to zero. Typically, a and b are used to balance the minimization of elemental mercury emissions against violation of a limit on CIA. Since violation of the limit on CIA is of great concern, typically the value of b will be much greater than the value of a. A typical value for a may be around 1 while a typical value for b may be around 1,000. In this case, given equation 11, the cost J is minimized as elemental mercury emissions, $c_{1,t+1}$, is reduce towards zero and the carbon in ash, $c_{2,t+1}$, is maintained below the limit, l.

In this embodiment of the invention, minimum and maximum constraints are placed on each of the manipulated variables. For example, the minimum constraint on excess oxygen may be 3% while the maximum value is 6%.

Given the cost function of equation 11, model 120D of elemental mercury emissions and CIA, equations 9 and 10, the current values of the disturbance variables, $d_t$, and the constraints on the manipulated variables, an NLP optimizer can be used to determine the optimal set of values for the manipulated variables. In the embodiment shown, the optimal set of values are output to DCS 150. DCS 150 uses these values to control operation of steam generating unit 200 to reduce elemental mercury emissions and to maintain CIA of steam generating unit 200 below the specified upper limit.

The steady state optimizer 110 is executed at a predetermined frequency, typically every 10-20 minutes. At each execution of optimizer 110, the model 120D is updated and a new set of manipulated variables is computed based upon updated model 120D. Using this approach, the manipulated variables are constantly updated based upon current conditions of steam generating unit 200.

Dynamic Mercury Optimization

Figure 8:
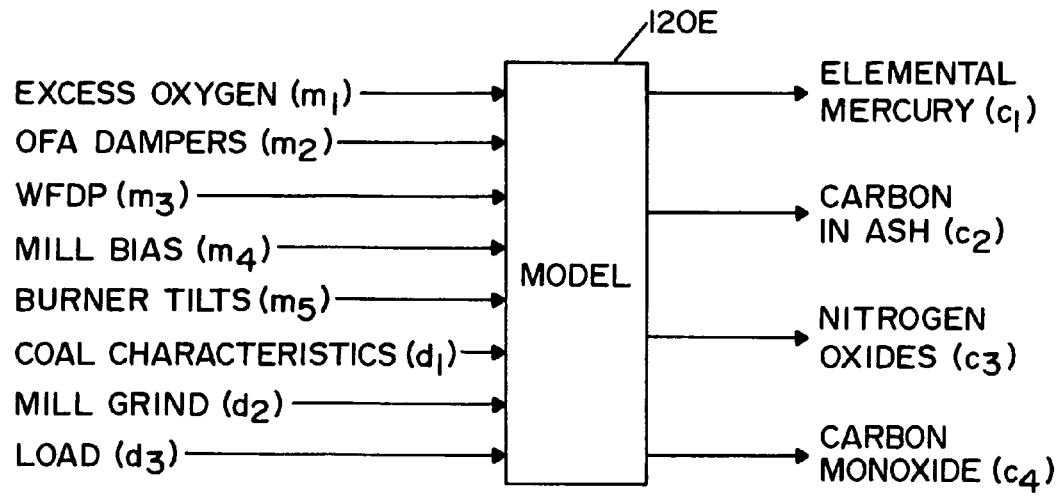
FIG. 8 illustrates a model for predicting elemental mercury emissions, carbon in ash (CIA), NOx emissions and CO emissions associated with a steam generating unit.

A second embodiment of optimization system 100 for mercury optimization will now be described. The goal of optimization system 100 of the second embodiment is to determine the optimal setpoint values for a set of manipulated variables such that elemental mercury emissions and nitrogen oxide emissions are reduced while the carbon in ash and carbon monoxide emissions are held below specified limits. A model predictive control (MPC) solution with a dynamic model is used in this embodiment. In this embodiment, model 120 takes the form of a dynamic model 120E shown in FIG. 8. Model 120E is formed by combining of a portion of model 120A (mercury emissions prediction), model 120B (fly ash characteristics prediction), and model 120C (predicted NOx and CO emissions), as described above.

A feedback biased version of the predicted elemental mercury emissions for model 120E can be represented as follows:

$$c_{1,t+1}=D(c_{1,t}, c_{1,t-1}, m_t, m_{t-1}, d_t, d_{t-1}, v)+(z_{1,t}-c_{1,t}) \quad (12)$$

where $z_{1,t}$ is the current reading (i.e., "measured value") of elemental mercury emissions and $c_{1,t}$ is the current prediction (i.e., "predicted value") of elemental mercury emissions. A feedback biased version of the predicted carbon in ash for model 120E can be represented as follows:

$$c_{2,t+1}=D(c_{2,t}, c_{2,t-1}, m_t, m_{t-1}, d_t, d_{t-1}, v)+(z_{2,t}-c_{2,t}) \quad (13)$$

where $z_{2,t}$ is the current reading (i.e., "measured value") of carbon in ash and $c_{2,t}$ is the current prediction (i.e., "predicted value") of carbon in ash. A feedback biased version for predicted NOx emission, $c_{3,t+1}$, and predicted CO emission, $c_{4,t+1}$, can be developed using empirical data. The predicted NOx and CO emissions can be represented by expressions similar to expressions (12) and (13).

Optimizer 110 (FIG. 3) preferably takes the form of a nonlinear programming (NLP) optimizer for computing the optimal set of values for manipulated variables over a time horizon from current time t to the end of the horizon at time t+N−1, $(m_t, m_{t+1}, m_{t+2}, \ldots, m_{t+T-1})$. To solve for the values of the manipulated variables, a cost function and set of constraints must be specified. In this embodiment of the present invention, the cost function is given by the following:

$$J = a\sum_{t=1}^{T} c_{1,t+1}^2 + b\sum_{t=1}^{T} H(c_{2,t+1} - l_1) + g\sum_{t=1}^{T} c_{3,t+1}^2 + h\sum_{t=1}^{T} H(c_{4,t+1} - l_2) + \sum_{n=0}^{5}\sum_{t=0}^{T-1} v_n(m_{n,t+1} - m_{n,t+t-1})^2 \quad (14)$$

where J is the cost value of the cost function, $l_1$ is the limit on carbon in ash, $l_2$ is the limit on carbon monoxide emission, H( ) is the heaviside function, and a, b, g, h and $v_n$ are tuning parameters that are great than zero. Typically, a, b, g and h are used to balance the minimization of mercury emissions and nitrogen oxides emission against violation of the limits on CIA and CO emission. Since violations of the limits may be of greater concern than minimizing mercury and NOx emissions, typically the values of b and h will be much greater than the values of a and g. Typical values for a and g may be around 1, while a typical values for b and h may be around 1,000.

The last term in Equation 14 is used for move suppression for each of the manipulated variables over the time horizon. This term penalizes movement of values for the manipulated variables from one time interval to the next over the trajectory. The tuning parameter, $v_n$, is associated with the $n^{th}$ manipulated variable. Typically, the value of $v_n$ is 1.

In this embodiment of the invention, minimum and maximum constraints are placed on each of the manipulated variables across the time horizon from time t to time t+N−1. For example, the minimum constraint on excess oxygen may be 3% while the maximum value may be 6% over the time horizon.

Given the cost function (equation 14), the model 120E of mercury emissions, CIA, NOx emission and CO emission, the current values of the disturbance variables, $d_t$, and the constraints on the manipulated variables, the NLP optimizer can be used to solve for the optimal set of values for the manipulated variables. In the embodiment shown, the optimal set of values are output to DCS 150. DCS 150 uses these values to control operation of plant 170.

Dynamic optimization using a dynamic model is performed at a faster frequency than that for a steady state optimization system. Typically, the optimization cycle will commence every 10-60 seconds for a mercury optimization problem. For each optimization cycle, model 120E is updated and a new set of values for the manipulated variables is computed based upon the updated model 120E. Using this approach, the values for the manipulated variables are constantly updated based upon current conditions of steam generating unit 200.

Mercury Models Combined with Control Means

Figure 9:
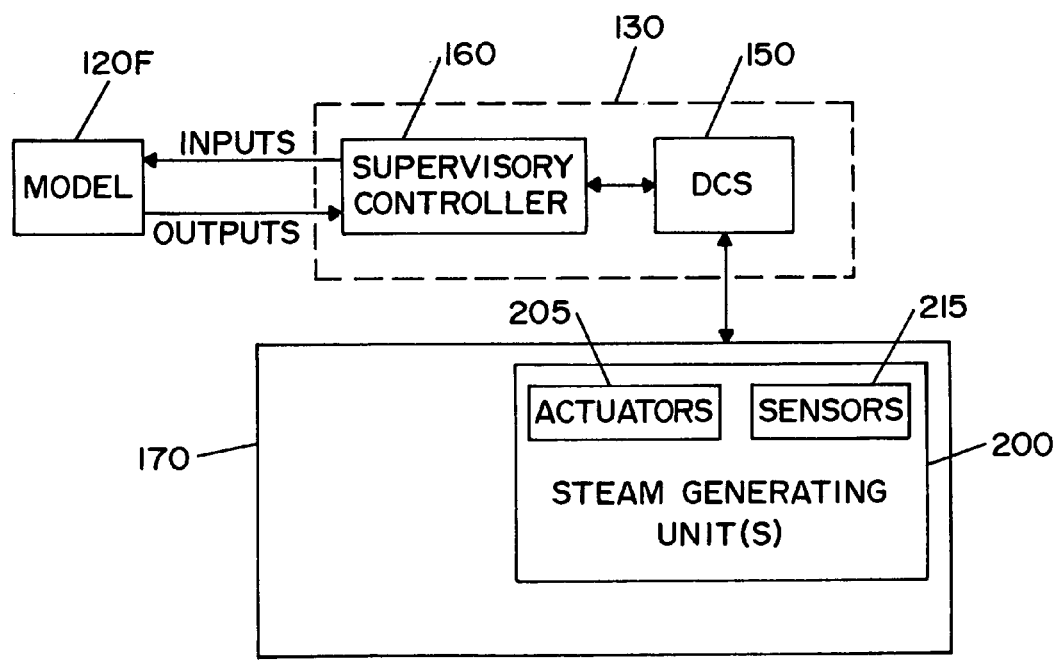
FIG. 9 illustrates a model used with control means of a steam generating plant, the control means comprised of a supervisory controller and a DCS.

Referring now to FIG. 9, there is shown a model 120F used in connection with a control means 130. Control means 130 is comprised of supervisory controller 160 and DCS 150. An optimizer 110 is optionally included in supervisory controller 160. An optimizer 110 is not used in the illustrated embodiment. Model 120F may reside on the same computer as supervisory controller 160 or on a separate computer.

Figure 4:
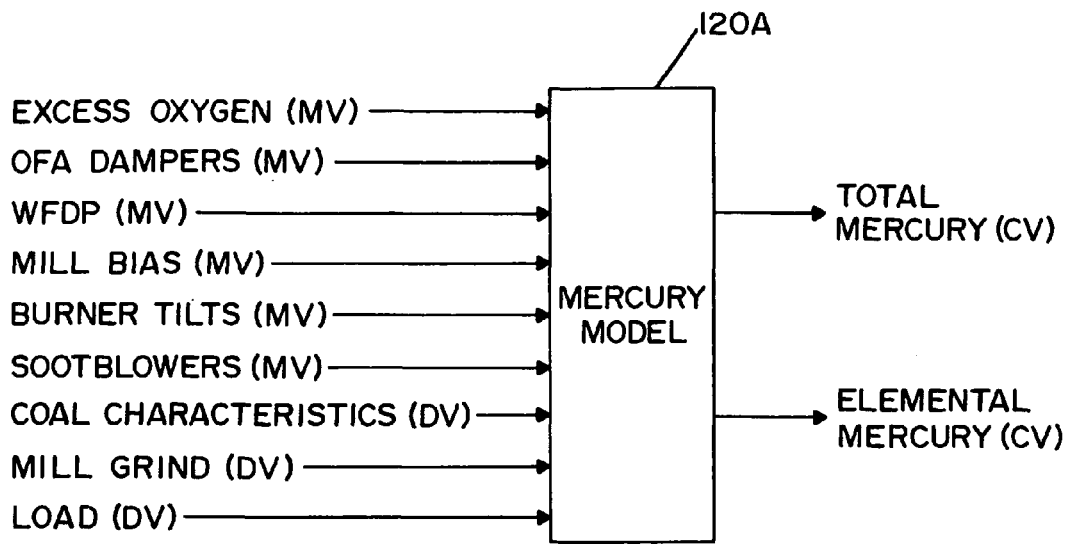
FIG. 4 illustrates a model for predicting both total mercury and elemental mercury emissions of a steam generating unit.

Model 120F may be comprised of multiple models, including, but not limited to, mercury emission model 120A of FIG. 4, fly ash characteristics model 120B of FIG. 5, and model 120C of FIG. 6.

Supervisory controller 160 uses model 120F to determine optimal setpoint values for the manipulated variables. As indicated above, optimizer 110 is not used in the illustrated embodiment. Accordingly, supervisory controller 160 may use model 120F in a number of control schemes including inverse control, linear quadratic regulators, adaptive critics, sliding mode controllers, and neural network controllers.

Figure 10:
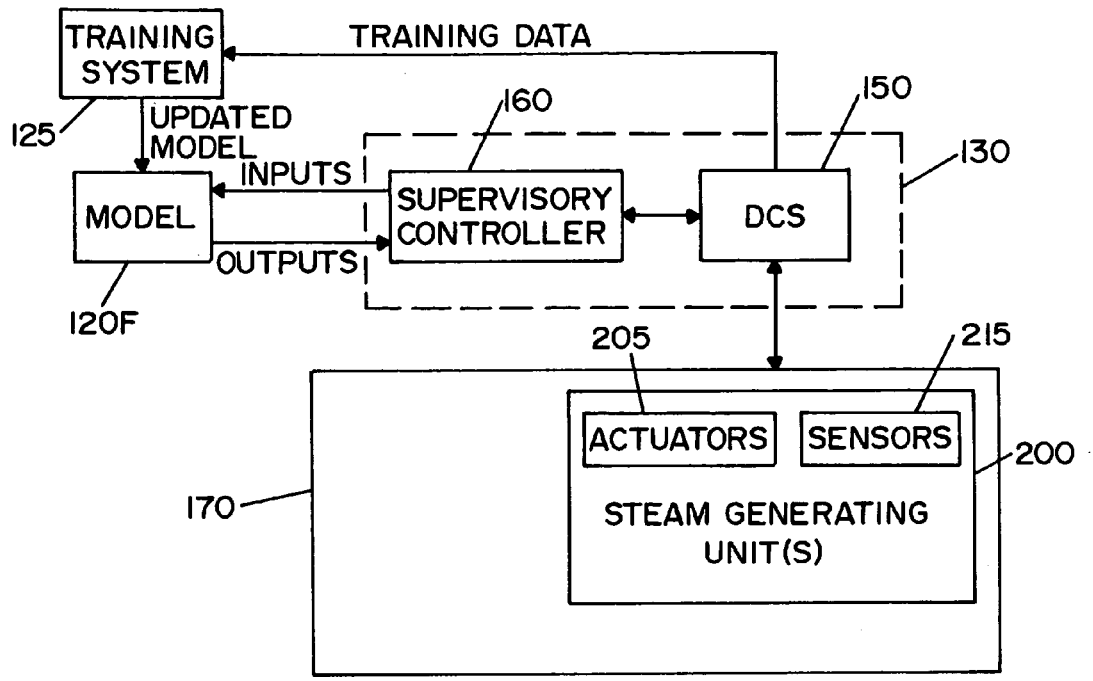
FIG. 10 shows a model used to predict values of controlled variables (e.g., mercury emissions) that is updated by a training system, wherein the model communicates with control means comprised of a supervisory controller and a DCS.

In the embodiment shown in FIG. 10, a training system 125 is also included to provide on-line, real time updating (i.e., training) of model 120F, based upon currently available training data received from DCS 150. Accordingly, model 120F is adaptive in this embodiment of the present invention. A variety of well known algorithms can be used to provide on-line updating of the models discussed herein.

Mercury Models as Virtual Sensors

It should be understood that the models described herein may alternatively be used as virtual (i.e., software-based) sensors or "virtual on-line analyzers." In this regard, the models may provide estimated values for controlled variables when the values for such controlled variables are not available to the DCS. For example, a mercury CEM may be temporarily installed to collect data for training the model. After the model is trained, the model, rather than the CEM, may be used to supply the value for mercury emissions to a control means. It should be understood that the model may provide an estimation of mercury emissions at various locations of a steam generating unit (e.g., between air preheater 212 and ESP 270, between ESP 270 and FGD 276, and at stack 290).

Likewise, the predictive or estimated values determined by the model may be used separately from control functions as information to interested parties such as operators, engineers, environmental experts, or simulation and other third party systems.

Figure 11:
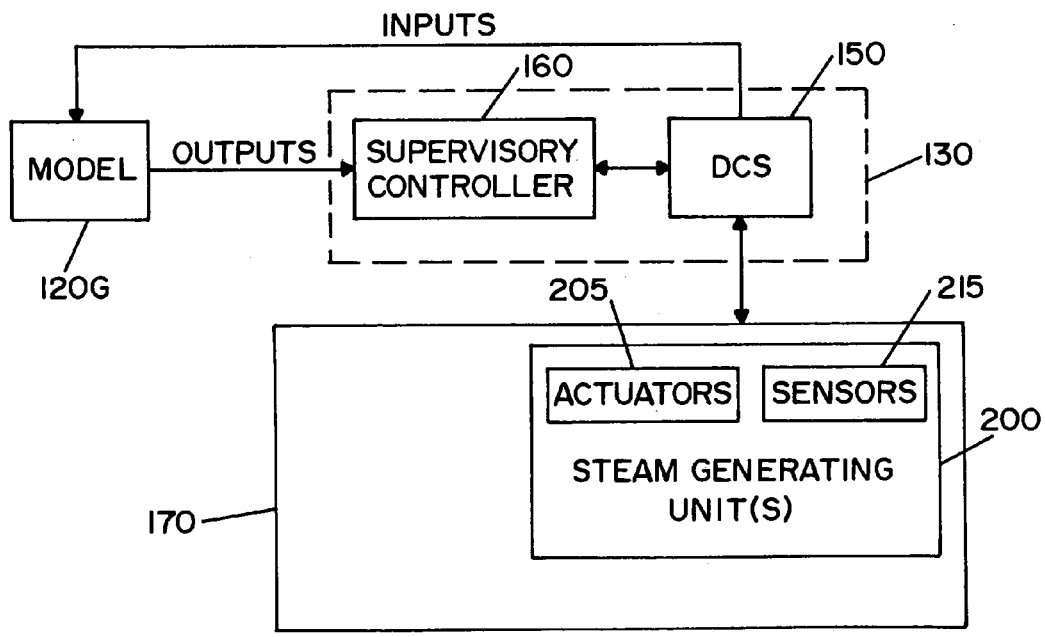
FIG. 11 shows a model used as a virtual sensor for estimating the values of controlled variables (e.g., mercury emissions), wherein the model communicates with control means comprised of a supervisory controller and a DCS.

In the embodiment illustrated in FIG. 11, control means 130 is comprised of a supervisory controller 160 and a DCS 150. DCS 150 supplies input values to the trained model 120G. The output values of model 120G are received by supervisory controller 160. Supervisory controller 160 uses the output values provided by model 120G to determine setpoint values for manipulated variables. The setpoint values are sent to DCS 150.

It should be noted that supervisory controller 120G may be a model-based controller as shown in FIG. 3. In this case, model 120G would be used for both estimating the current value of mercury emissions as well as for model-based control.

Figure 12:
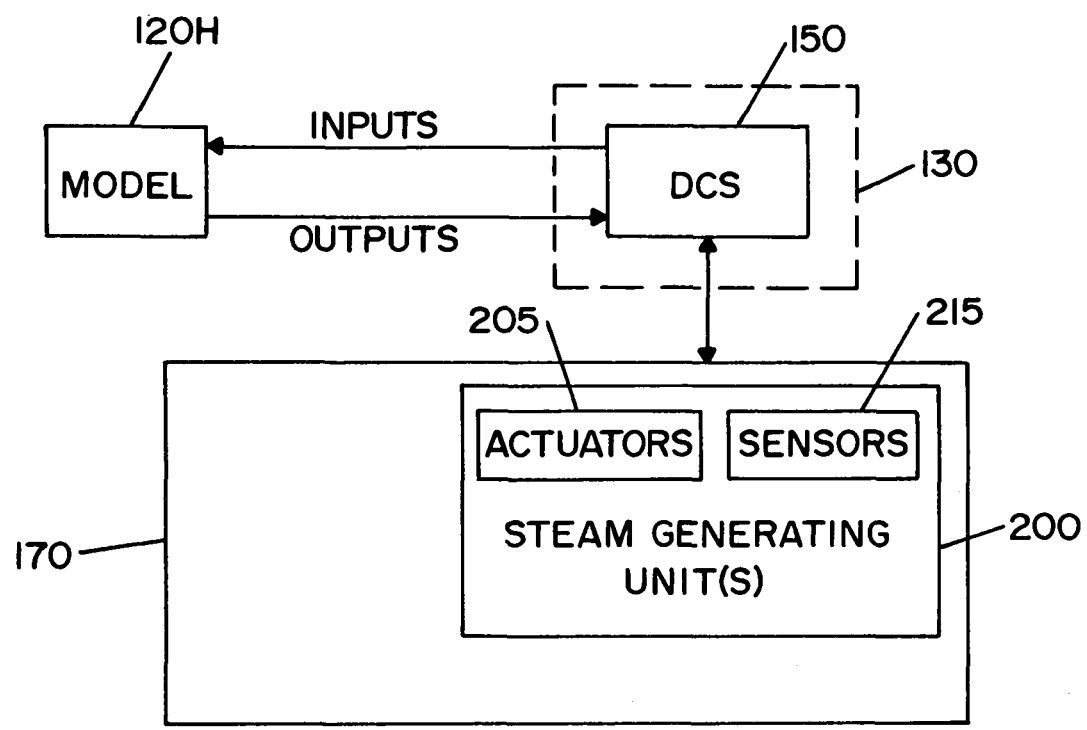
FIG. 12 shows a model used as a virtual sensor for estimating the values of controlled variables (e.g., mercury emissions), wherein the model communicates with control means comprised of a DCS.

Referring now to FIG. 12, there is shown an embodiment of the present invention wherein the control means 130 is comprised of DCS 150. By way of example, and not limitation, control may implemented by Proportional-Integral-Derivative (PID) control loops within DCS 150. PIDs in DCS 150 are used to control plant 170 based upon estimates provided by model 120H.

Input values to model 120H are received from DCS 150. Model 120H can determine estimated values for controlled variables such as mercury emissions (e.g., total mercury emissions, oxidized mercury emissions, elemental mercury emissions, and/or particulate mercury emissions), fly ash characteristics, and other controlled variables, as discussed above. The output values of model 120H are sent to DCS 150. DCS 150 uses the output values of model 120H in PID loops within DCS 150.

Other modifications and alterations will occur to others upon their reading and understanding of the specification. It is intended that all such modifications and alterations be included insofar as they come within the scope of the invention as claimed or the equivalents thereof.

Having described the invention, the following is claimed:

1. A system for controlling operation of a fossil fuel fired steam generating unit, the system comprising:
 a model of the steam generating unit embodied in a computer readable medium, said model predicting mercury emissions of the steam generating unit based upon a plurality of input values that are current values for manipulated variables and disturbance variables associated with current operating conditions of the steam generating unit, and for outputting at least one output value indicative of mercury emitted by said steam generating unit in accordance with the input current values of the manipulated variables and the disturbance variables; and
 a computer control system for receiving the at least one output value from the model and determining optimal setpoint values for manipulated variables using the at least one output value of the model, and for controlling operation of the steam generating unit in accordance with the determined optimal setpoint values for the manipulated variables, said manipulated variables affecting mercury oxidation by influencing one or more of the following factors for oxidation of mercury: proximity of compounds reacting with mercury, residence time of mercury within a reaction temperature zone, and the presence of surface structures as they relate to conversion reactions, wherein said computer control system comprises:
  an optimizer for determining the optimal setpoint values for the manipulated variables to obtain a desired level of mercury emissions of the steam generating unit, said optimizer receiving said at least one output value from said model to determine the optimal setpoint values for the manipulated variables, wherein said optimizer determines a respective optimal setpoint value for each said manipulated variable by accessing said model to minimize a cost value of a cost function that is a mathematical representation of one or more goals, while observing a plurality of constraints, said cost value affected by the value for each said manipulated variable, said cost function including a predicted value indicative of elemental mercury emissions of the steam generating unit and a value associated with carbon in ash (CIA), said cost function including a term that decreases as the level of mercury oxidation increases,
 wherein said computer control system repeatedly provides the model with current values of the manipulated and disturbance variables associated with current operating conditions of the steam generating unit, in order to determine updated optimal setpoint values from the at least one output value of the model.

2. A system according to claim 1, wherein said cost value is affected by the value of each said manipulated variable over a plurality of time intervals, said optimizer determining a respective value for each said manipulated variable for the plurality of time intervals in accordance with minimization of said cost value.

3. A system according to claim 2, wherein the respective value of each said manipulated variable for a first time interval of the plurality of time intervals is determined as said respective optimal setpoint value for an optimization cycle.

4. A system according to claim 2, wherein said optimizer determines said respective value for each said manipulated variable for said plurality of time intervals while observing said plurality of constraints across said plurality of time intervals.

5. A system according to claim 1, wherein said plurality of constraints include at least one of the following: a carbon in ash (CIA) limit for fly ash generated by the steam generating unit, a CO emissions limit of the steam generating unit, a NOx emissions limit of said steam generating unit, and a mercury emissions limit of said steam generating unit.

6. A system according to claim 1, wherein said cost function further includes at least one of the following: a predicted value for a controlled variable indicative of NOx emissions of said steam generating unit; and a predicted value indicative of boiler efficiency of said steam generating unit.

7. A system according to claim 1, wherein said optimizer is implemented using a technique selected from the group consisting of the following:
 non-linear programming, stochastic programming, global non-linear programming, genetic algorithms, and particle/swarm techniques.

8. A system according to claim 1, wherein said at least one output value indicative of mercury emitted by said steam generating unit is associated with at least one of the following: total mercury emitted by said steam generating unit; oxidized mercury emitted by said steam generating unit; elemental mercury emitted by said steam generating unit; and particulate mercury emitted by said steam generating unit.

9. A system according to claim 1, wherein said computer control system means includes a system for providing regulatory control.

10. A system according to claim 9, wherein said computer control system includes a supervisory controller in communication with said system for providing regulatory control.

11. A system according to claim 1, wherein said manipulated variables include at least one of the following:
 level of excess oxygen in flue gas produced by the steam generating unit, over-fire air (OFA) damper positions of the steam generating unit, windbox-to-furnace differential pressure (WFDP) of the steam generating unit, mill bias of each mill of the steam generating unit, burner tilt angles of the steam generating unit, operational states of soot cleaning devices of the steam generating unit, chemical composition of fuel for the steam generating unit, blend of coal used as fuel in the steam generating unit, and blend of coal and additives used as fuel in the steam generating unit.

12. A system according to claim 1, wherein said disturbance variables include at least one of the following:
 characteristics of fuel for the steam generating unit, conditions of mill grind of the steam generating unit, load demand associated with the steam generating unit, and ambient conditions of the steam generating unit.

13. A system according to claim 1, wherein said model includes an output for outputting at least one output value associated with at least one of the following controlled variables:
 total mercury emitted by the steam generating unit; elemental mercury emitted by the steam generating unit; total oxidized mercury emitted by the steam generating unit; carbon in ash; surface area fly ash particles; particle size distribution of fly ash particles; CO emissions of the steam generating unit; "heat rate" of the steam generating unit; "boiler efficiency" of the steam generating unit; NOx emissions of the steam generating unit; heterogeneous reaction of mercury in the steam generating unit, and reactivity of fly ash with mercury.

14. A system according to claim 1, wherein said model is updated using an output value of said model indicative of mercury emitted by said steam generating unit and a measured value indicative of mercury emitted by said steam generating unit.

15. A system according to claim 1, wherein said model is updated using feedback biasing.

16. A system according to claim 1, wherein said model is retrained on-line using a regression based approach.

17. A system according to claim 16, wherein said regression based approach is selected from the group consisting of the following: a backpropagation algorithm, a conjugate gradient method, and an optimization technique.

18. A system according to claim 1, wherein said model is executed on-line or in a simulation.

19. A method for controlling mercury emissions produced by a fossil fuel fired steam generating unit, the method comprising:
(a) obtaining current values of manipulated variables and disturbance variables associated with current operating conditions of the steam generating unit, said manipulated variables affecting mercury oxidation by influencing one or more of the following factors for oxidation of mercury: proximity of compounds reacting with mercury, residence time of mercury within a reaction temperature zone, and the presence of surface structures as they relate to conversion reactions;
(b) inputting the current values of the manipulated variables and the disturbance variables into a model of said steam generating unit for predicting mercury emissions, said model generating at least one output value indicative of mercury emissions produced by said steam generating unit in accordance with the input current values of the manipulated variables and the disturbance variables;
(c) sending the at least one output value to a control means for controlling operation of the steam generating unit, said control means determining optimal setpoint values for manipulated variables using the at least one output value of the model by minimizing a cost value of a cost function that is a mathematical representation of one or more goals, while observing a plurality of constraints, said cost value affected by the value of said manipulated variables, said cost function including a predicted value indicative of elemental mercury emissions of the steam generating unit and a value associated with carbon in ash (CIA), said cost function including a term that decreases as the level of mercury oxidation increases;
(d) controlling operation of said steam generating unit with the control means, using the determined optimal setpoint values for the manipulated variables;
(e) repeating steps (a), (b), (c) and (d) during operation of the steam generating unit, as current operating conditions of the steam generating unit change.

20. A method according to claim 19, wherein said control means includes a regulatory control system.

21. A method according to claim 19, wherein said model is executed on-line or in a simulation.

22. A method according to claim 20, wherein said control means includes a supervisory controller in communication with said regulatory control system, said supervisory controller receiving said at least one output value.

23. A method according to claim 19, wherein said manipulated variables include at least one of the following:
level of excess oxygen in flue gas produced by the steam generating unit, over-fire air (OFA) damper positions of the steam generating unit, windbox-to-furnace differential pressure (WFDP) of the steam generating unit, mill bias of each mill of the steam generating unit, burner tilt angles of the steam generating unit, operational states of soot cleaning devices of the steam generating unit, chemical composition of fuel for the steam generating unit, blend of coal used as fuel in the steam generating unit, and blend of coal and additives used as fuel in the steam generating unit.

24. A method according to claim 19, wherein said disturbance variables include at least one of the following:
characteristics of fuel for the steam generating unit, conditions of mill grind of the steam generating unit, load demand associated with the steam generating unit, and ambient conditions of the steam generating unit.

25. A method according to claim 24, wherein said characteristics of the fuel including at least one of the following: ash content volatile matter, moisture content, viscosity, constituent minerals, and BTU content.

26. A method according to claim 19, wherein said model is selected from the group consisting of one or more of the following: a steady state model and a dynamic model.

27. A method according to claim 19, wherein said model is selected from the group consisting of one or more of the following: a neural network model, an empirically developed model, a model developed using "first principles," and a model based upon heuristics.

28. A method according to claim 19, wherein said at least one output value indicative of mercury emissions is associated with at least one of the following:
total mercury emitted by the steam generating unit; elemental mercury emitted by the steam generating unit; and total oxidized mercury emitted by the steam generating unit.

29. A method according to claim 19, wherein said model generates at least one output value associated with at least one of the following:
carbon in ash; surface area fly ash particles; particle size distribution of fly ash particles; CO emissions of the steam generating unit; "heat rate" of the steam generating unit; "boiler efficiency" of the steam generating unit; NOx emissions of the steam generating unit; heterogeneous reaction of mercury in the steam generating unit, and reactivity of fly ash with mercury.

30. A method according to claim 19, wherein said model is updated using an output value of said model indicative of mercury emitted by said steam generating unit and a measured value indicative of mercury emitted by said steam generating unit.

31. A method according to claim 19, wherein said model is updated using feedback biasing.

32. A method according to claim 19, wherein said model is retrained on-line using a regression based approach.

33. A method according to claim 32, wherein said regression based approach is selected from the group consisting of the following: a backpropagation algorithm, a conjugate gradient method, and an optimization technique.

34. A method for controlling operation of a fossil fuel fired steam generating unit, the method comprising:
(a) generating a model of the steam generating unit for predicting mercury emissions of the steam generating unit;

(b) obtaining current values of manipulated variables and disturbance variables associated with current operating conditions of the steam generating unit, said manipulated variables affecting mercury oxidation by influencing one or more of the following factors for oxidation of mercury; proximity of compounds reacting with mercury, residence time of mercury within a reaction temperature zone, and the presence of surface structures as they relate to conversion reactions;

(c) inputting the current values of the manipulated variables and the disturbance variables into the model of the steam generating unit for predicting mercury emissions, said model generating at least one output value indicative of mercury emitted by the steam generating unit in accordance with the input current values of the manipulated variables and the disturbance variables;

(d) determining optimal setpoint values for the manipulated variables using the at least one output value of the model and minimizing a cost value of a cost function that is a mathematical representation of one or more goals, while observing a plurality of constraints, said cost value affected by the value of said manipulated variables, said cost function including a predicted value indicative of elemental mercury emissions of the steam generating unit and a value associated with carbon in ash (CIA), said cost function including a term that decreases as the level of mercury oxidation increases;

(e) controlling operation of the steam generating unit using the optimal setpoint values for the manipulated variables; and (f) repeating steps (a) through (e) during operation of the steam generating unit, as current operating conditions of the steam generating unit change.

35. A method according to claim 34, wherein said cost value is affected by the value of said manipulated variables over a plurality of time intervals, said optimal setpoint values determined at a first time interval of the plurality of time intervals.

36. A method according to claim 35, wherein the respective value of each said manipulated variable for a first time interval of the plurality of time intervals is determined as said respective optimal setpoint value for an optimization cycle.

37. A method according to claim 35, wherein said respective value for each said manipulative variable is determined for said plurality of time intervals while observing said plurality of constraints across said plurality of time intervals.

38. A method according to claim 34, wherein said plurality of constraints include at least one of the following: a carbon in ash (CIA) limit for fly ash generated by the steam generating unit, a CO emissions limit of the steam generating unit, a NOx emissions limit of said steam generating unit, and a mercury emissions limit of said steam generating unit.

39. A method according to claim 34, wherein said cost function further includes at least one of the following: a predicted value for a controlled variable indicative of NOx emissions of said steam generating unit; and a predicted value indicative of boiler efficiency of said steam generating unit.

40. A method according to claim 34, wherein said manipulated variables include at least one of the following:
level of excess oxygen in flue gas produced by the steam generating unit, over-fire air (OFA) damper positions of the steam generating unit, windbox-to-furnace differential pressure (WFDP) of the steam generating unit, mill bias of each mill of the steam generating unit, burner tilt angles of the steam generating unit, operational states of soot cleaning devices of the steam generating unit, chemical composition of fuel for the steam generating unit, blend of coal used as fuel in the steam generating unit, and blend of coal and additives used as fuel in the steam generating unit.

41. A method according to claim 34, wherein said disturbance variables include at least one of the following:
characteristics of fuel for the steam generating unit, conditions of mill grind of the steam generating unit, load demand associated with the steam generating unit, and ambient conditions of the steam generating unit.

42. A method according to claim 34, wherein said model of the steam generating unit outputting at least one output value indicative of at least one of the following:
total mercury emitted by the steam generating unit; elemental mercury emitted by the steam generating unit; total oxidized mercury emitted by the steam generating unit; carbon in ash; surface area of fly ash particles; particle size distribution of fly ash particles; CO emissions of the steam generating unit; "heat rate" of the steam generating unit; "boiler efficiency" of the steam generating unit; NOx emissions of the steam generating unit; heterogeneous reaction of mercury in the steam generating unit, and reactivity of fly ash with mercury.

43. A method according to claim 34, wherein said model is updated using an output value of said model indicative of mercury emitted by said steam generating unit and a measured value indicative of mercury emitted by said steam generating unit.

44. A method according to claim 34, wherein said model is updated using feedback biasing.

45. A method according to claim 34, wherein said model is retrained on-line using a regression based approach.

46. A method according to claim 45, wherein said regression based approach is selected from the group consisting of the following: a backpropagation algorithm, a conjugate gradient method, and an optimization technique.

47. A method according to claim 34, wherein said model is executed on-line or in a simulation.

48. A system according to claim 1, wherein said cost function includes terms over a future time horizon.

49. A system according to claim 19, wherein said cost function includes terms over a future time horizon.

50. A system according to claim 34, wherein said cost function includes terms over a future time horizon.

* * * * *